(12) United States Patent
Beaurepaire et al.

(10) Patent No.: US 11,017,669 B2
(45) Date of Patent: May 25, 2021

(54) METHODS AND SYSTEMS FOR PROVIDING PARKING ASSISTANCE FOR VEHICLES

(71) Applicant: HERE GLOBAL B.V., Eindhoven (NL)

(72) Inventors: Jerome Beaurepaire, Berlin (DE); Sven Krome, Berlin (DE); Jens Unger, Berlin (DE); Joachim Meister, Berlin (DE)

(73) Assignee: HERE Global B.V., Eindhoven (NL)

( * ) Notice: Subject to any disclaimer, the term of this patent is extended or adjusted under 35 U.S.C. 154(b) by 79 days.

(21) Appl. No.: 16/197,123

(22) Filed: Nov. 20, 2018

(65) Prior Publication Data

US 2020/0160712 A1 May 21, 2020

(51) Int. Cl.
*G01C 21/36* (2006.01)
*G08G 1/14* (2006.01)
*G06N 5/04* (2006.01)

(52) U.S. Cl.
CPC ......... *G08G 1/143* (2013.01); *G01C 21/3685* (2013.01); *G06N 5/046* (2013.01); *G08G 1/147* (2013.01)

(58) Field of Classification Search
CPC ................................. G06Q 10/00; H04W 4/00
See application file for complete search history.

(56) References Cited

U.S. PATENT DOCUMENTS

| 6,665,613 | B2 | 12/2003 | Duvall |
| 9,066,206 | B2 | 6/2015 | Lin et al. |
| 9,971,348 | B1 | 5/2018 | Canavor et al. |

(Continued)

FOREIGN PATENT DOCUMENTS

| CN | 107221087 A | 9/2017 |
| JP | 2014089153 A2 | 5/2014 |

OTHER PUBLICATIONS

"GREENbike Strategic Implementation Plan Salt Lake City Core: 2014-2020", retrieved on Nov. 8, 2018 from http://policies.sharedusemobilitycenter.org/policy/509/files, 49 pages.

(Continued)

*Primary Examiner* — Shirley Lu
(74) *Attorney, Agent, or Firm* — Ditthavong, Steiner & Mlotkowski

(57) ABSTRACT

A system, method, and computer program product may be provided for providing on-street parking predictions. A system may include a memory configured to store computer program code instructions; and a processor configured to execute the computer program code instructions to receive service boundary geometry data for a service boundary from one or more shared vehicle service providers; provide on-street parking predictions, based on the received service boundary geometry data; and render a representation of the on-street parking predictions on a user interface of a user device. The processor may be further configured to receive a modification for the service boundary geometry data via the user interface of the user device; update the on-street parking predictions based on the modified service boundary geometry data; and update the representation of the on-street parking predictions on the user interface of the user device, based on the updated on-street parking predictions.

21 Claims, 22 Drawing Sheets

(56) References Cited

U.S. PATENT DOCUMENTS

| | | | |
|---|---|---|---|
| 2004/0024621 A1* | 2/2004 | Read | G06Q 30/02 |
| | | | 705/6 |
| 2009/0171566 A1* | 7/2009 | Morimoto | G08G 1/147 |
| | | | 701/465 |
| 2014/0011522 A1* | 1/2014 | Lin | H04W 4/029 |
| | | | 455/456.2 |
| 2015/0294431 A1* | 10/2015 | Fiorucci | G07B 15/02 |
| | | | 705/13 |
| 2016/0195404 A1 | 7/2016 | Prasad et al. | |
| 2016/0247327 A1* | 8/2016 | Kozawa | G06Q 10/06 |
| 2018/0188049 A1 | 7/2018 | Shi et al. | |

OTHER PUBLICATIONS

Toole Design Group and the Pedestrian and Bicycle Information Center, "Bike Sharing in the United States: State of the Practice and Guide to Implementation", retrieved on Nov. 8, 2018 from https://www.bikesharing.ch/fileadmin/redaktion/bikesharing/Dokumente/Documents_et_autres/Bikesharing_in_the_United_States.pdf, pp. 1-68.
Maciejewski et al., "Simulation and Dynamic Optimization of Taxi Services in Matsim", retrieved on Nov. 8, 2018 from https://pdfs.semanticscholar.org/92df/69a3da030f1b9b1ecd16a032b28d014ab755.pdf, pp. 1-34.

* cited by examiner

US 11,017,669 B2

METHODS AND SYSTEMS FOR PROVIDING PARKING ASSISTANCE FOR VEHICLES

TECHNOLOGICAL FIELD

The present disclosure generally relates to providing parking assistance for vehicles, and more particularly relates to providing parking assistance for vehicles based on service boundaries of service areas defined by one or more shared vehicle service providers.

BACKGROUND

Shared vehicle service providers define service areas to cater to a large number of users in different geographical locations. These service areas generally define limits of geographical area within which the shared vehicle service providers can provide service. Typically, vehicles owned by the shared vehicle service providers are rented by the users to navigate to a specified destination, such as a desired destination or a parking location in vicinity of the users' desired destination, and the users are suggested to park their vehicles within the limits or boundaries of the service areas once their purpose is served. Parking of the vehicles outside the boundaries of the service areas typically results in a heavy penalty being levied from the users. However, determining parking spots within the boundaries of the service areas consumes a considerable amount of time of the users and also, results in congestion in the road links within the service areas because of multiple users trying to find suitable parking spaces. Accordingly, there is a need for providing parking assistance to users of shared vehicles in an efficient, less time consuming, and more accurate manner, to ease the problems of congestion and lengthy search time in procuring suitable parking spaces.

BRIEF SUMMARY

Existing parking assistance systems provide navigation assistance to users without any information about service areas of shared vehicle service providers. Sometimes, boundaries of the service areas catered by the shared vehicle service providers may changed for various reasons, for example, for expanding coverage in other regions of the cities, for meeting demands created by users of the vehicles, for being competitive with other shared vehicle service providers, etc. The boundaries of the service areas may have an effect on the availability of parking spots in the service areas. It would be advantageous for parking assistance systems to consider the boundaries of the service areas while providing assistance to the users of the vehicles in finding parking spots based on their personal choices. It would also be advantageous for the parking assistance systems to implement various parking strategies in recommending multiple navigation routes to the parking spots within the service areas. Existing parking assistance systems are agnostic of the service boundaries of shared vehicle service providers. The invention is directed to utilizing these boundaries as an additional input for the parking assistance models.

A system, method, and computer program product are provided in accordance with an example embodiment described herein for providing on-street parking predictions. Embodiments disclosed herein may provide a system for providing on-street parking predictions. The system may include at least one non-transitory memory configured to store computer program code instructions, and at least one processor configured to execute the computer program code instructions to at least: receive service boundary geometry data for a service boundary from one or more shared vehicle service providers, provide the on-street parking predictions, based on the received service boundary geometry data, and render a representation of the on-street parking predictions on a user interface of a user device. The processor may be optionally configured to receive a modification for the service boundary geometry data for the shared vehicle service providers via the user interface of the user device, update the on-street parking predictions based on the modified service boundary geometry data, and update the representation of the on-street parking predictions on the user interface of the user device, based on the updated on-street parking predictions. The processor may further be configured to update the on-street parking predictions based on time of day. The processor may also be configured to determine time-dependent parking pattern based on at least one load balancing model of vehicles of the shared vehicle service providers, where the service boundary geometry data is associated with a determined time-dependent parking pattern adjacent to the service boundary.

The processor may be optionally configured to obtain parking impact data based on the time-dependent parking pattern, and render a recommendation for updating the service boundary geometry data of the shared vehicle service providers, based on the parking impact data, where the parking impact data includes a time of day, number of vehicles within a service boundary, pollution causing events within the service boundary, occurrence of fairs within the service boundary, and/or traffic data within the service boundary. In some example embodiments, the parking impact data may be further based on an availability of alternate modes of transport within a service boundary. In an embodiment, the processor may be configured to notify via the user device about at least one of changes in service boundaries, an availability of parking spots in road links within the service boundaries, parking estimation times in available parking spots in the road links, and parking options in the available parking spots in the road links. The processor, in some example embodiments, may be configured to generate the on-street parking predictions by training a candidate machine learning model using historical sensor data from a plurality of vehicles of the shared vehicle service providers, real-time sensor data from the plurality of vehicles of the shared vehicle service providers, parking spot availability data, destination information of a user of a vehicle, and/or navigation routes within a service area.

In an example embodiment, a method for providing on-street parking predictions may be provided that includes: receiving, by a processor, service boundary geometry data for a service boundary from one or more shared vehicle service providers, providing on-street parking predictions, based on the received service boundary geometry data, and rendering, by the processor, a representation of the on-street parking predictions on a user interface of a user device. The method may further include: receiving a modification for the service boundary geometry data for the shared vehicle service providers via the user interface of the user device, updating the on-street parking predictions based on the modified service boundary geometry data, and updating the representation of the on-street parking predictions on the user interface of the user device, based on the updated on-street parking predictions. The service boundary geometry data is associated with a determined time-dependent parking pattern adjacent to the service boundary and the method may include updating the on-street parking predictions based on time of day. The method may further include notifying via the user device about at least one of changes in service boundaries, availability of parking spots in links within the service boundaries, parking estimation times in available parking spots in the links, and parking options in the available parking spots in the links. The method may further include obtaining parking impact data based on the time-dependent parking pattern and rendering a recommendation for updating the service boundary geometry data of the shared vehicle service providers based on the parking impact data, where the parking impact data is based on an availability of alternate modes of transport within a service boundary. In the step of generating the on-street parking predictions, the method may include training a candidate machine learning model using historical sensor data from a plurality of vehicles of the shared vehicle service providers, real-time sensor data from the plurality of vehicles of the shared vehicle service providers, parking spot availability data, destination information of a user of a vehicle, and/or navigation routes within the service boundary.

Embodiments of the present invention may provide a computer program product including at least one non-transitory computer-readable storage medium having computer-executable program code instructions stored therein. The computer-executable program code instructions when executed by a computer, cause the computer to carry out operations for providing on-street parking predictions, the operations including: receiving service boundary geometry data from one or more shared vehicle service providers, providing on-street parking predictions, based on the received service boundary geometry data, and rendering a representation of the on-street parking predictions on a user interface of a user device. According to some embodiments, the operations further include: receiving a modification for the service boundary geometry data for the shared vehicle service providers via the user interface of the user device, updating the on-street parking predictions based on the modified service boundary geometry data, and updating the representation of the on-street parking predictions on the use interface of the user device, based on the updated on-street parking predictions.

BRIEF DESCRIPTION OF THE DRAWINGS

Figure 1:
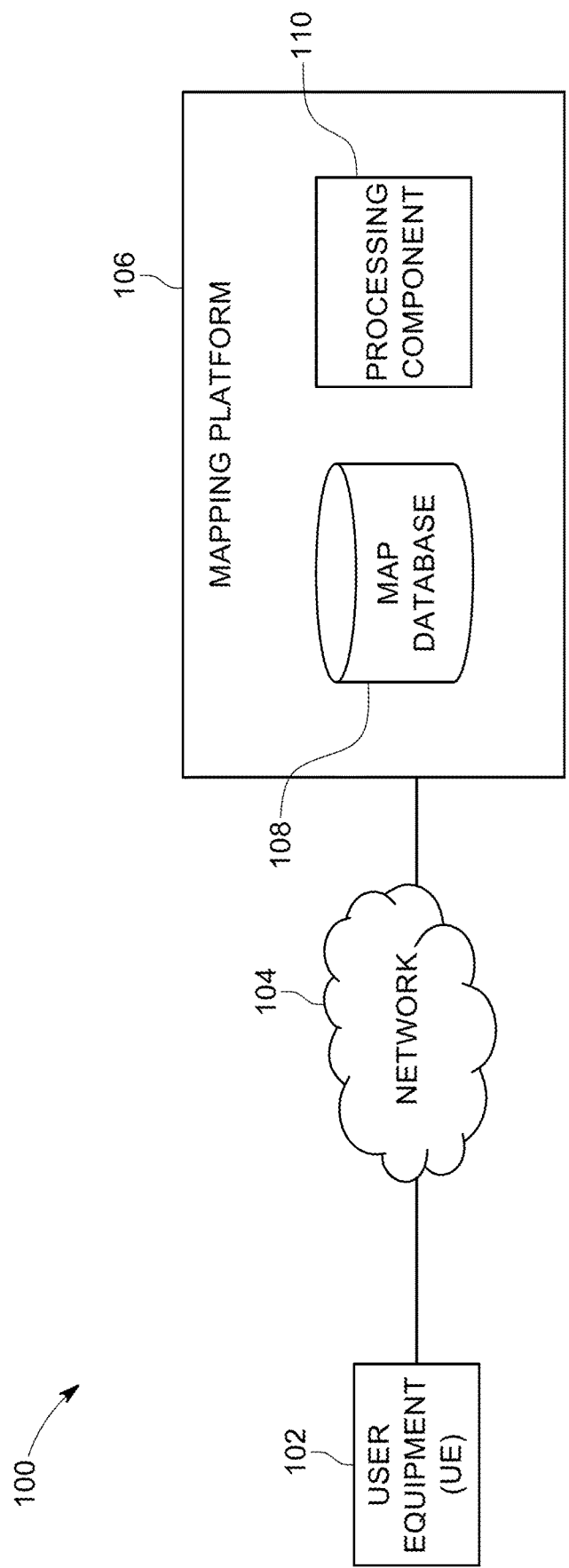
Figure 2:
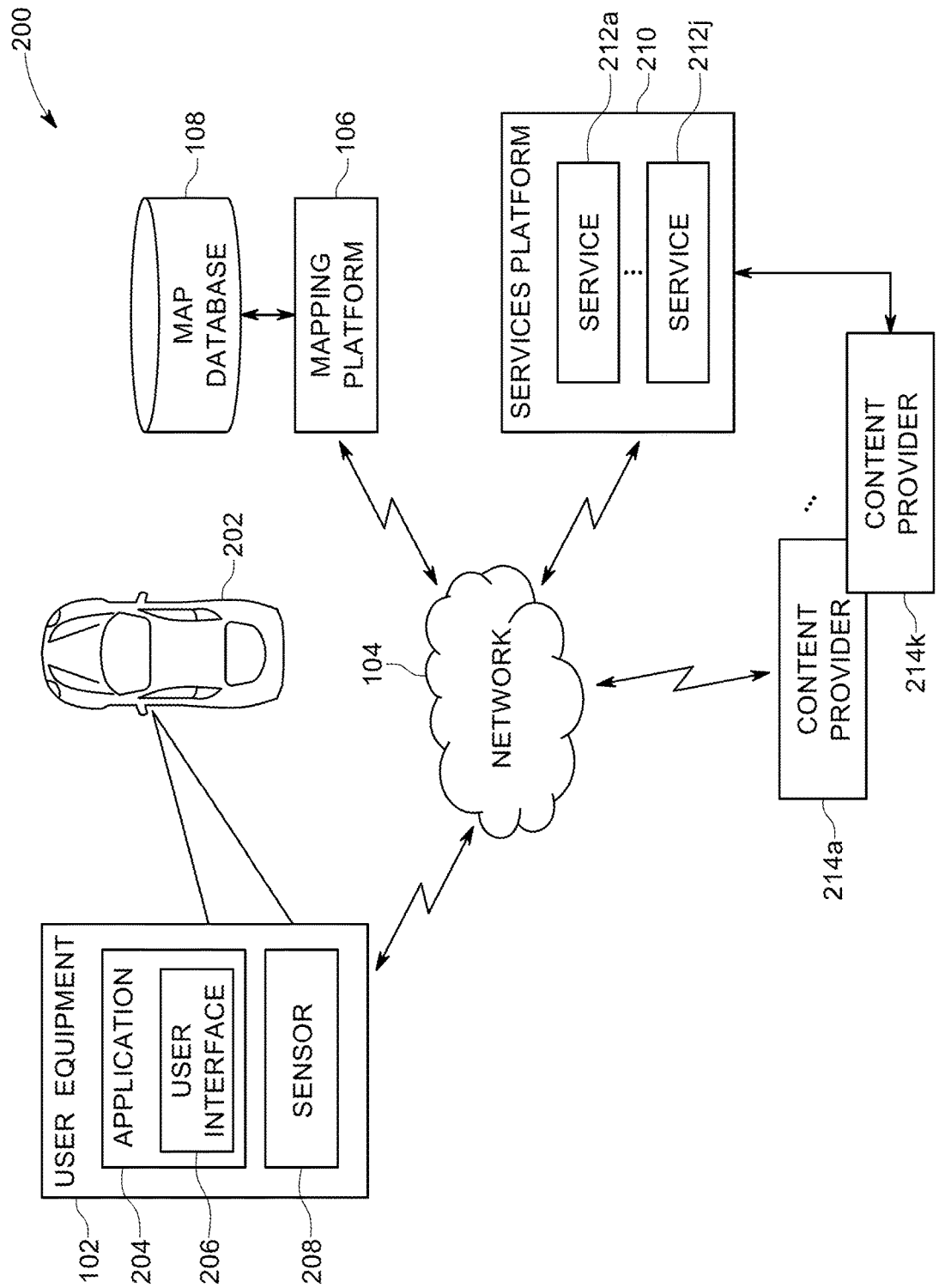
Figure 3:
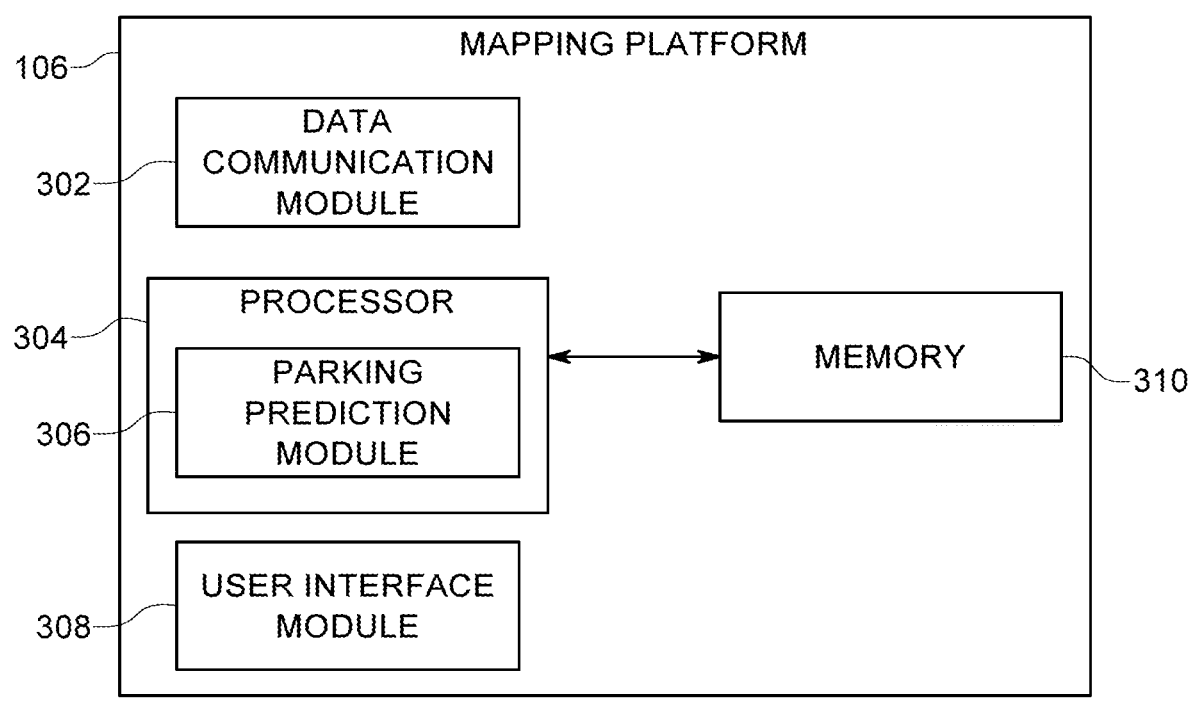
Figure 4:
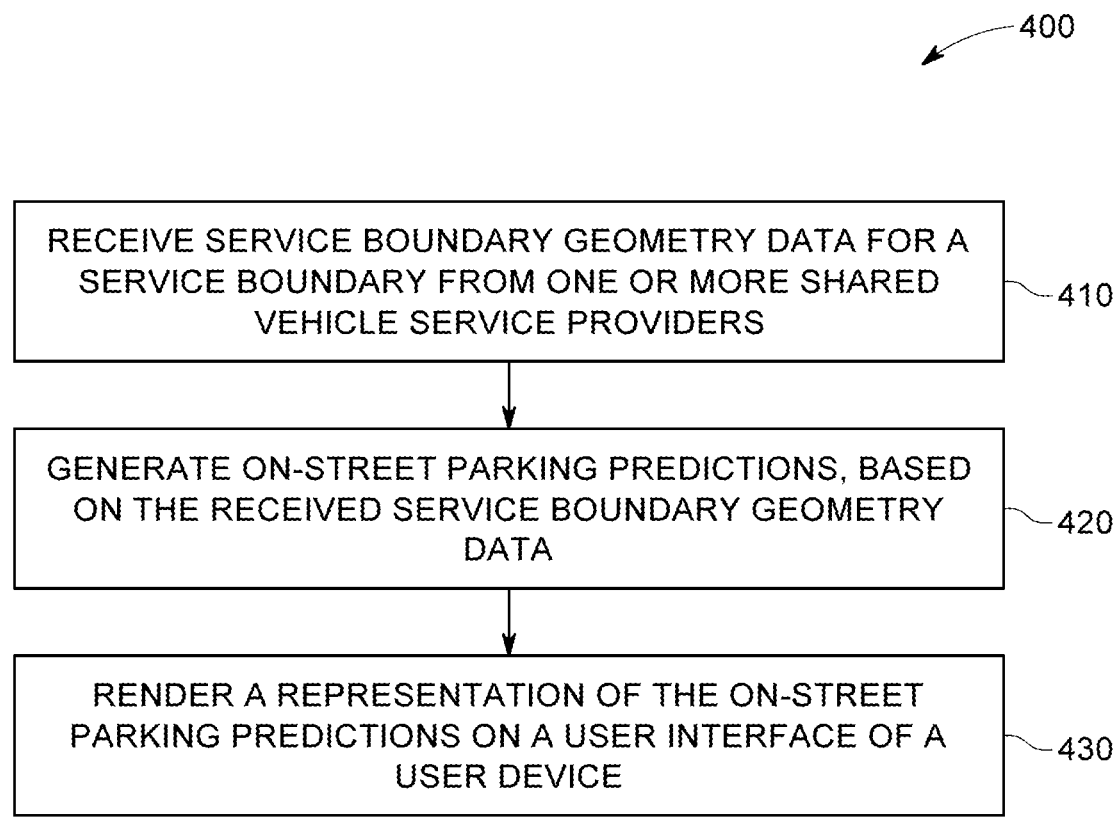
Figure 5:
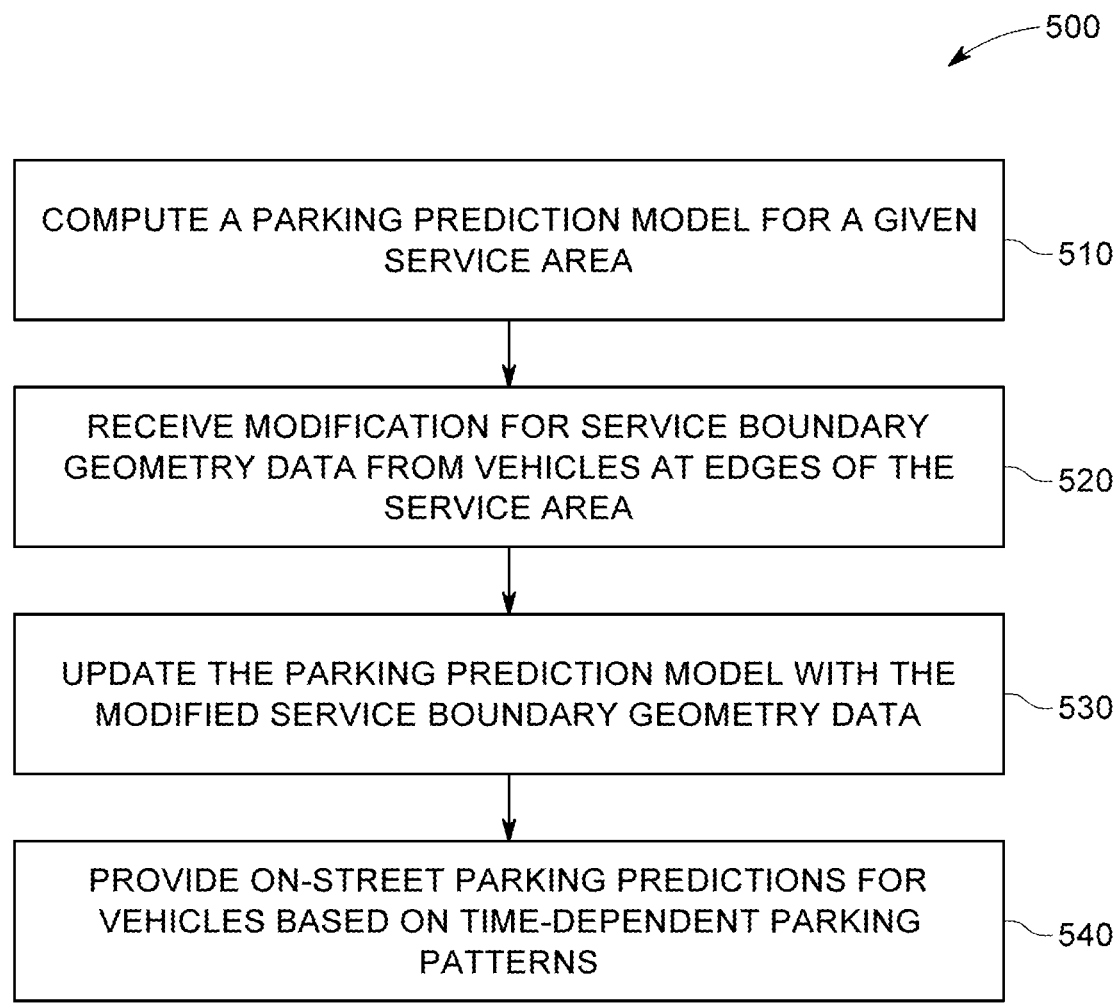
Figure 6:
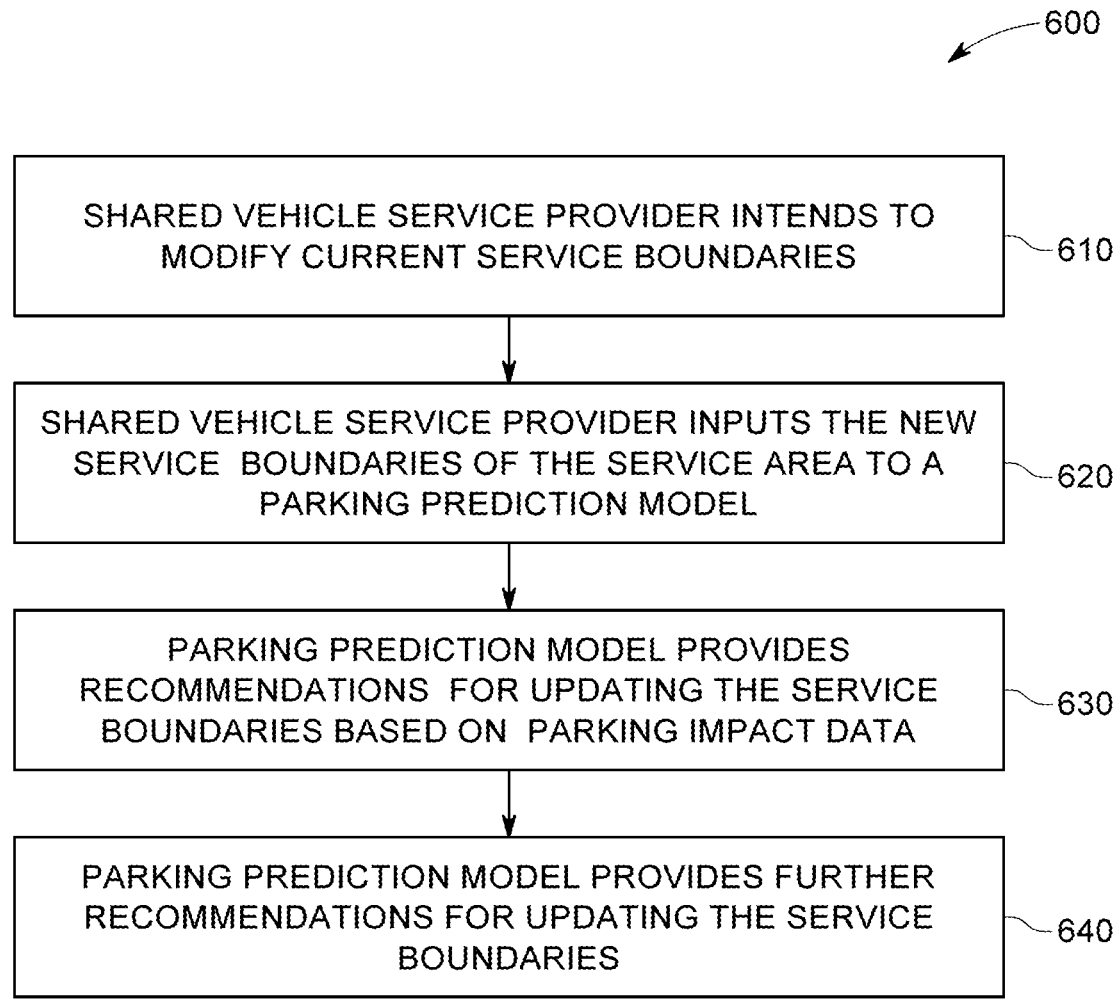
Figure 7A:
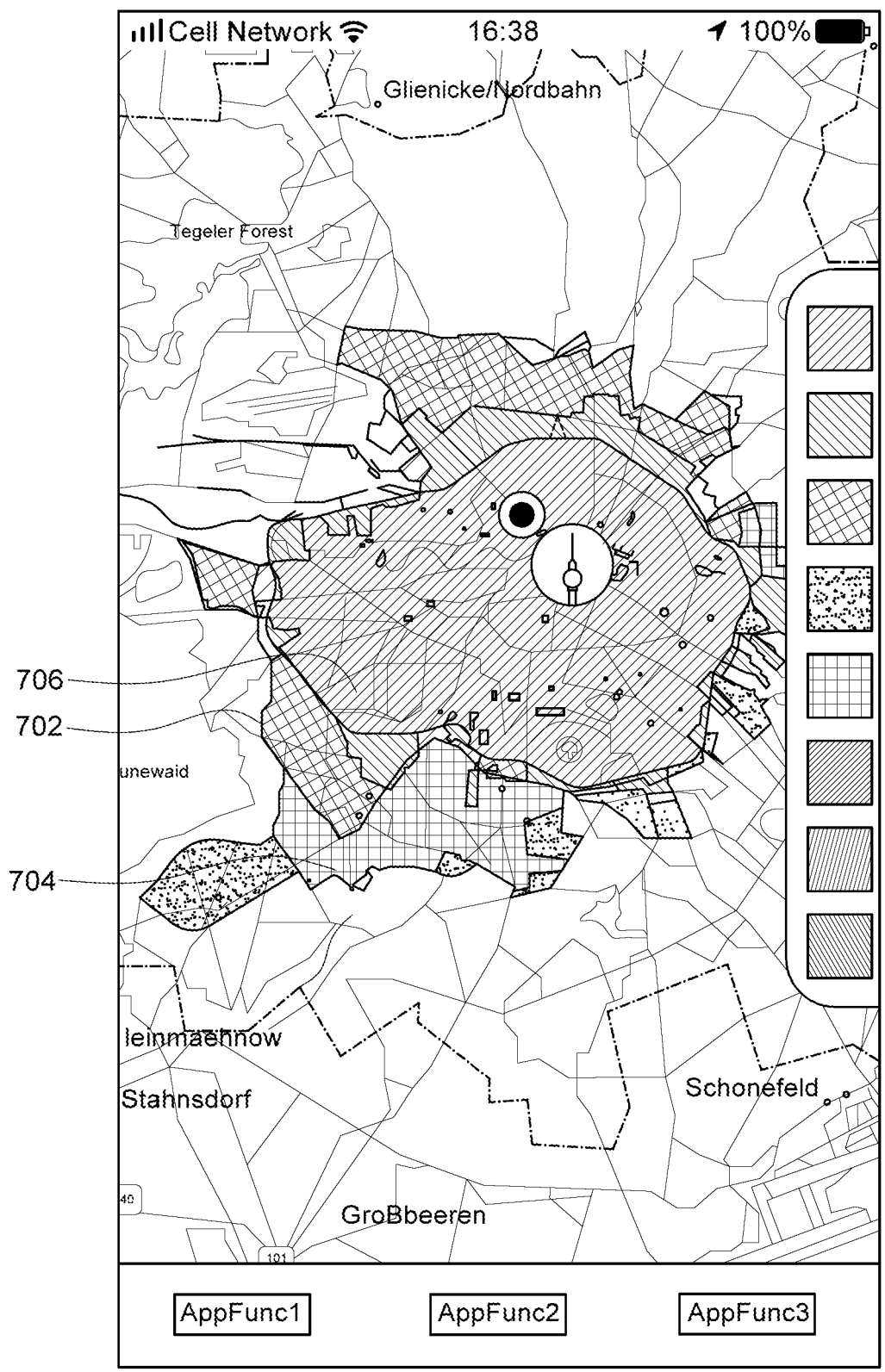
Figure 7B:
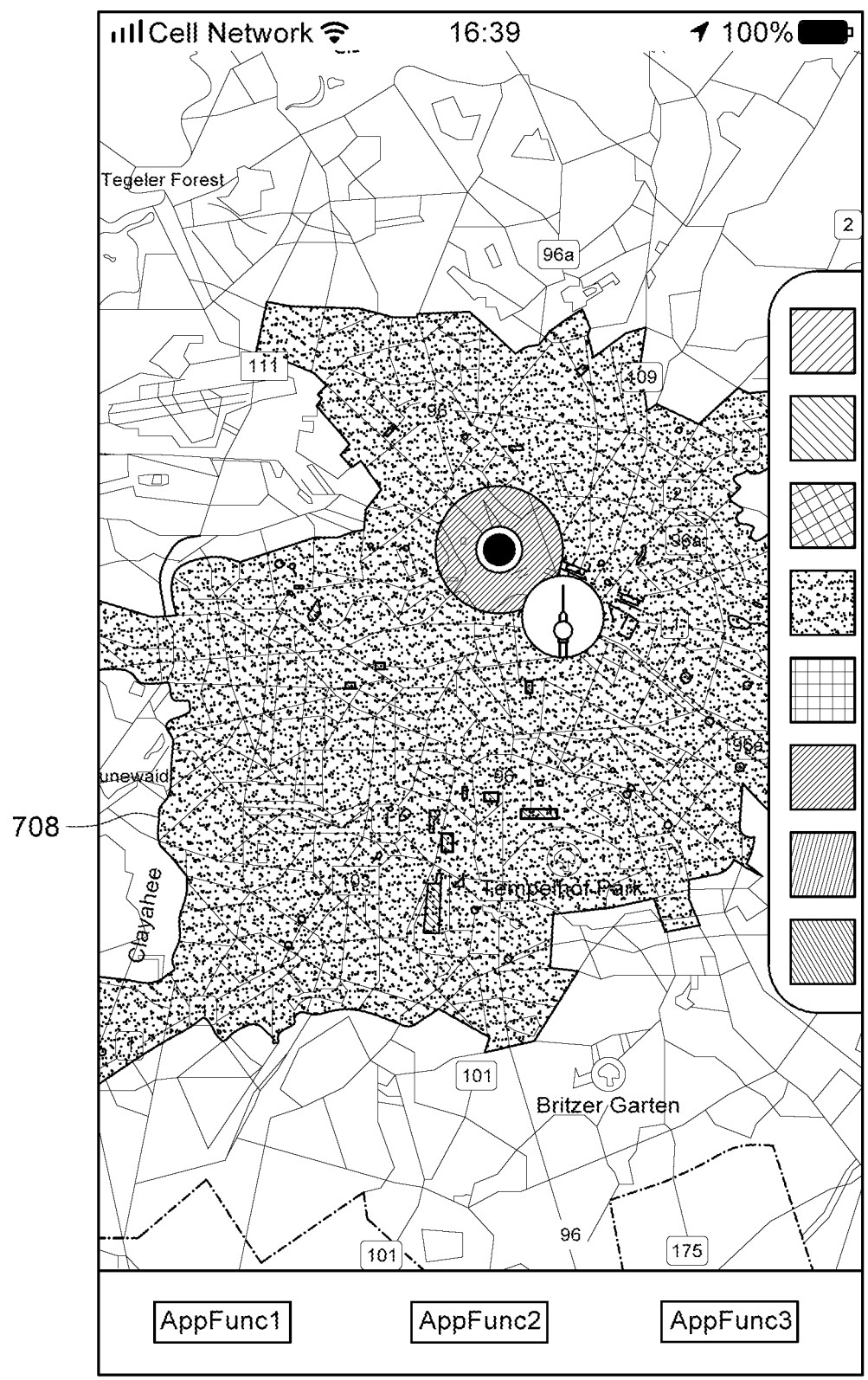
Figure 7C:
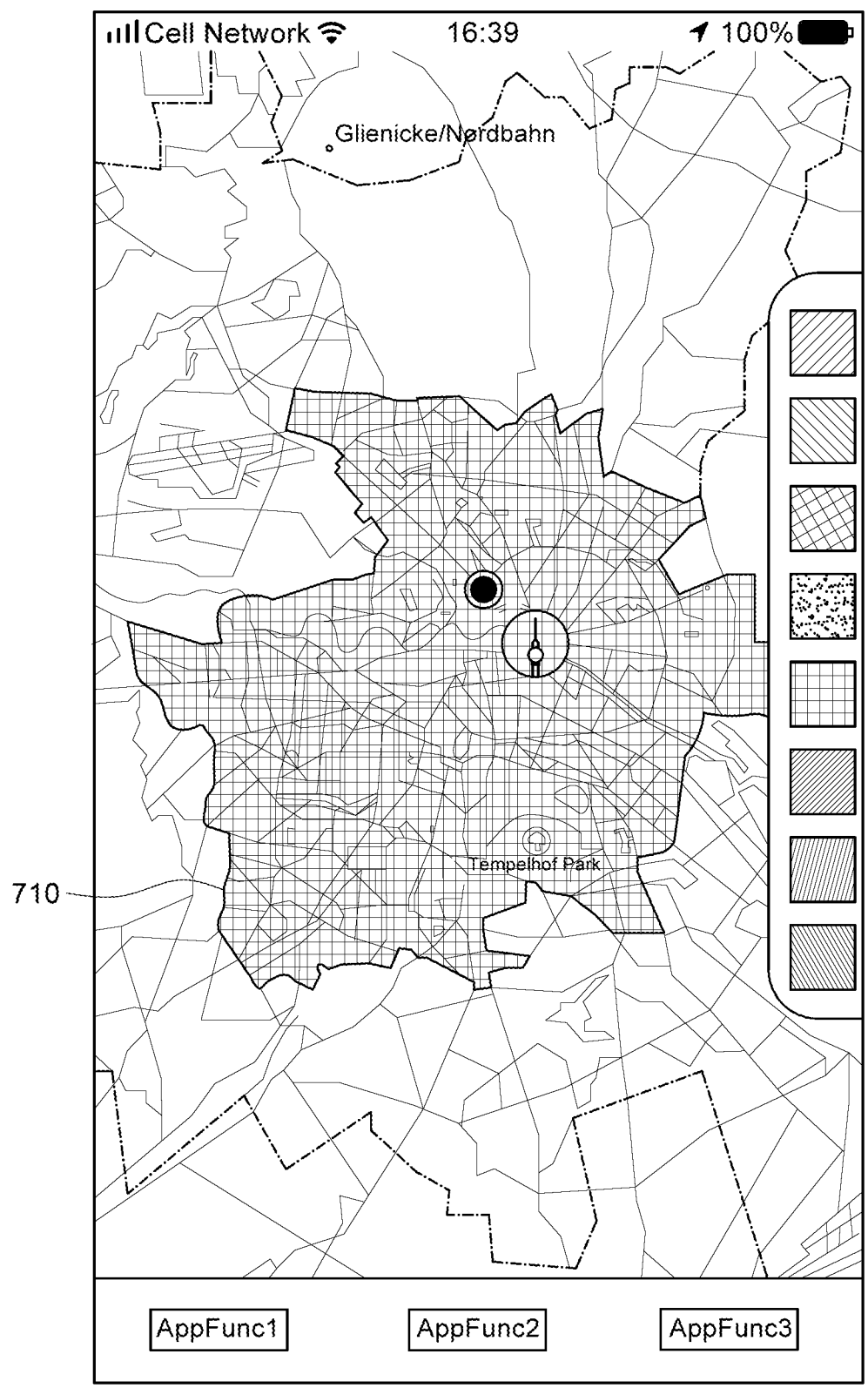
Figure 8A:
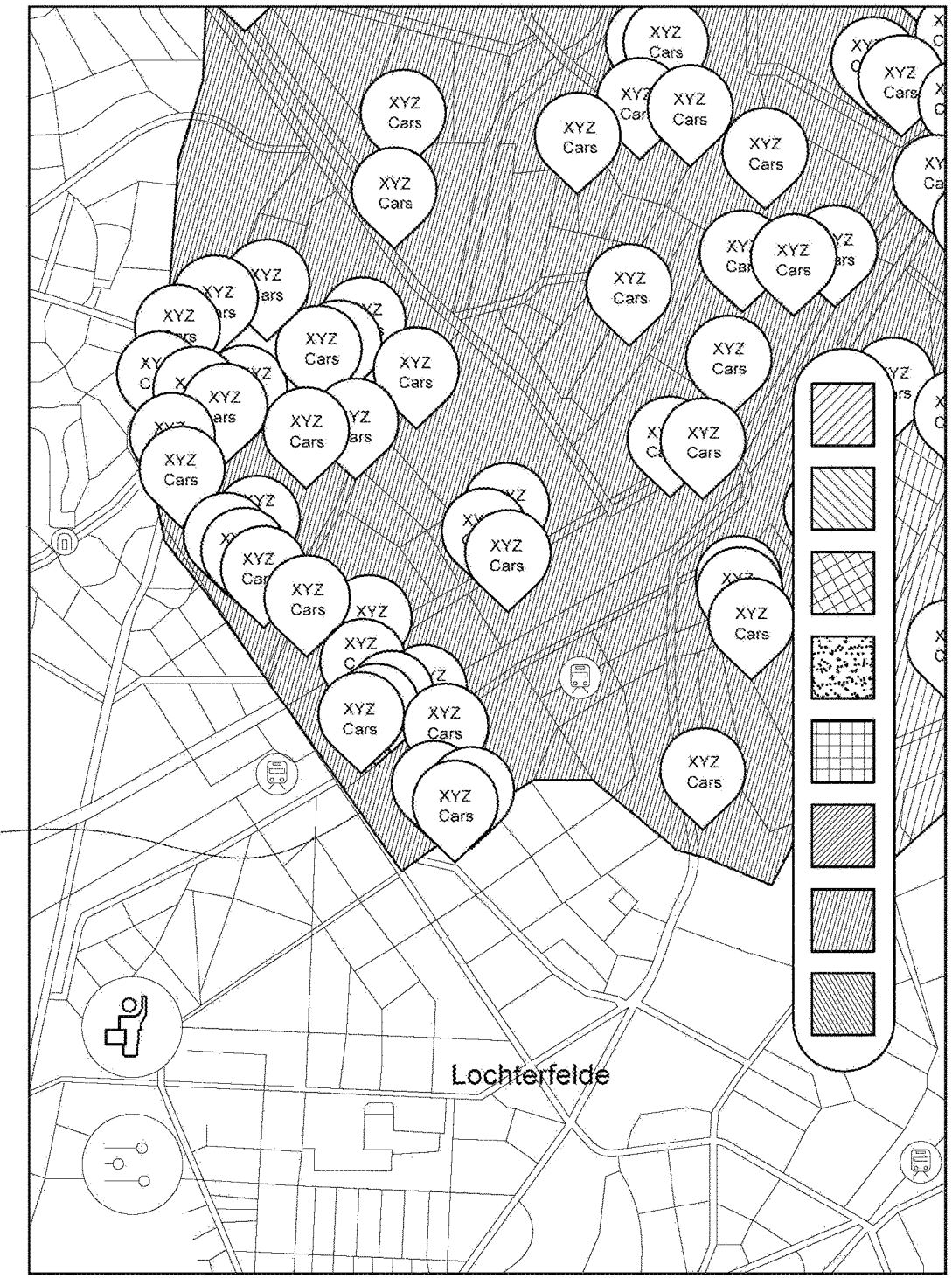
Figure 8B:
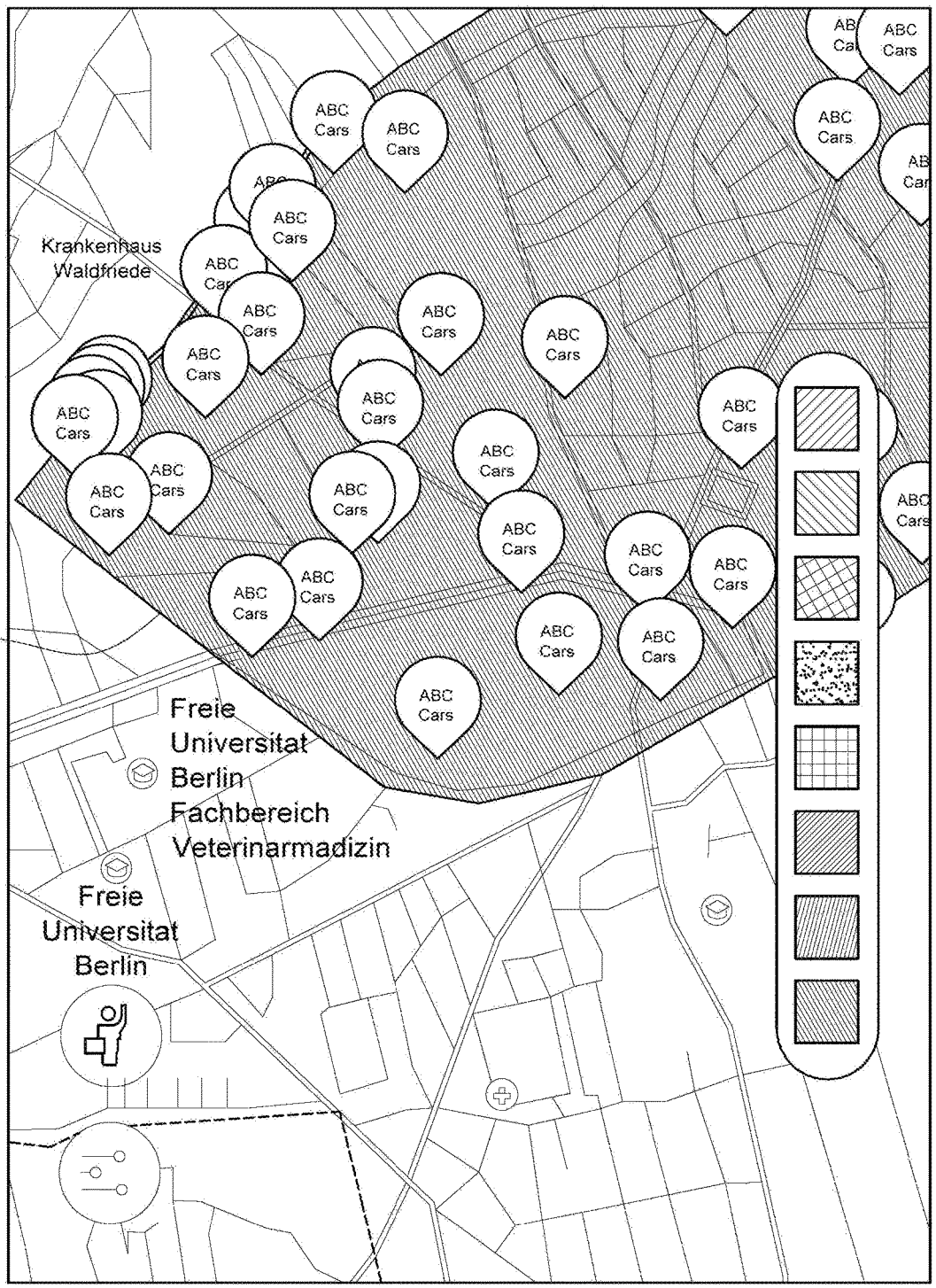
Figure 8C:
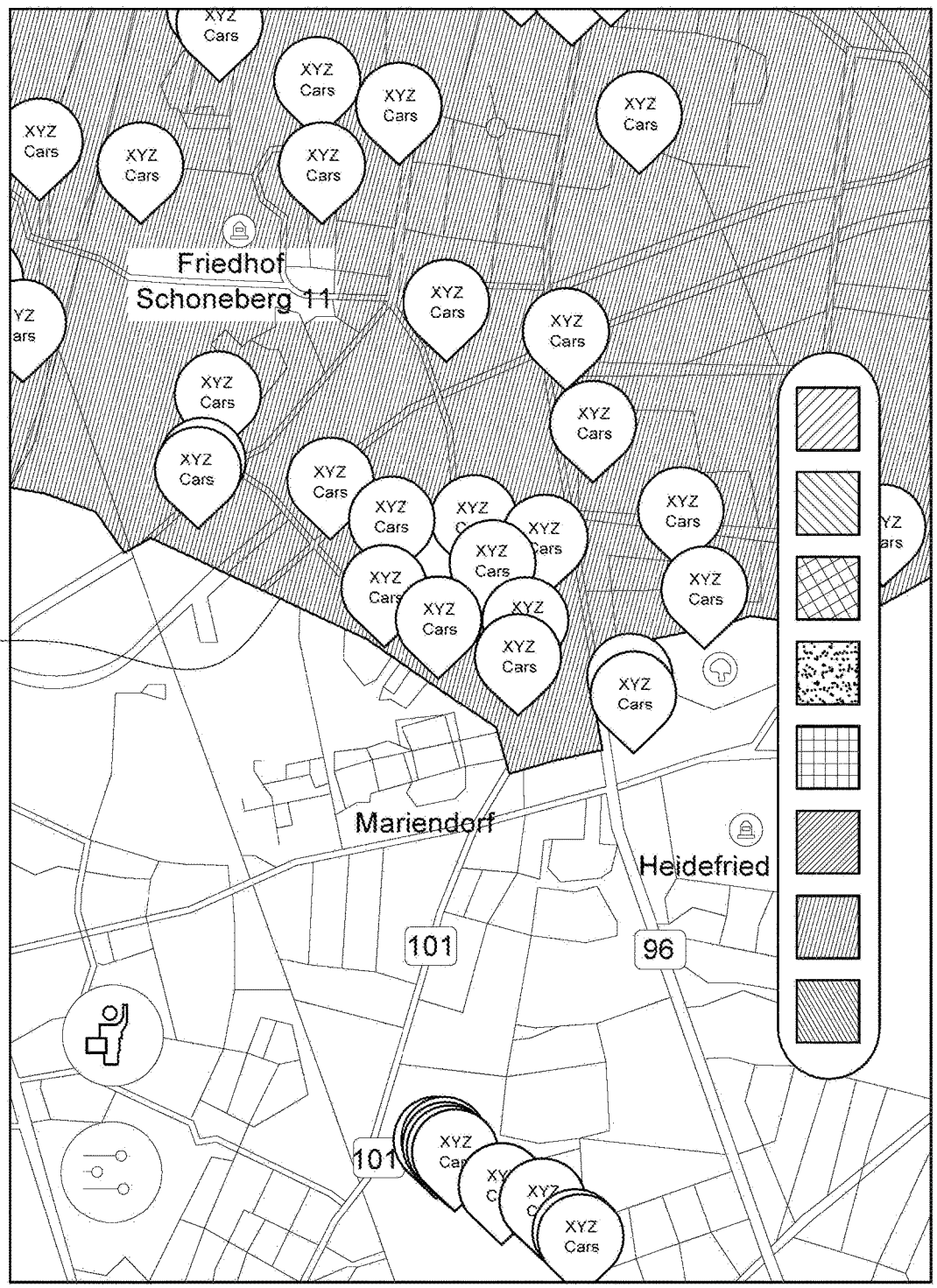
Figure 9A:
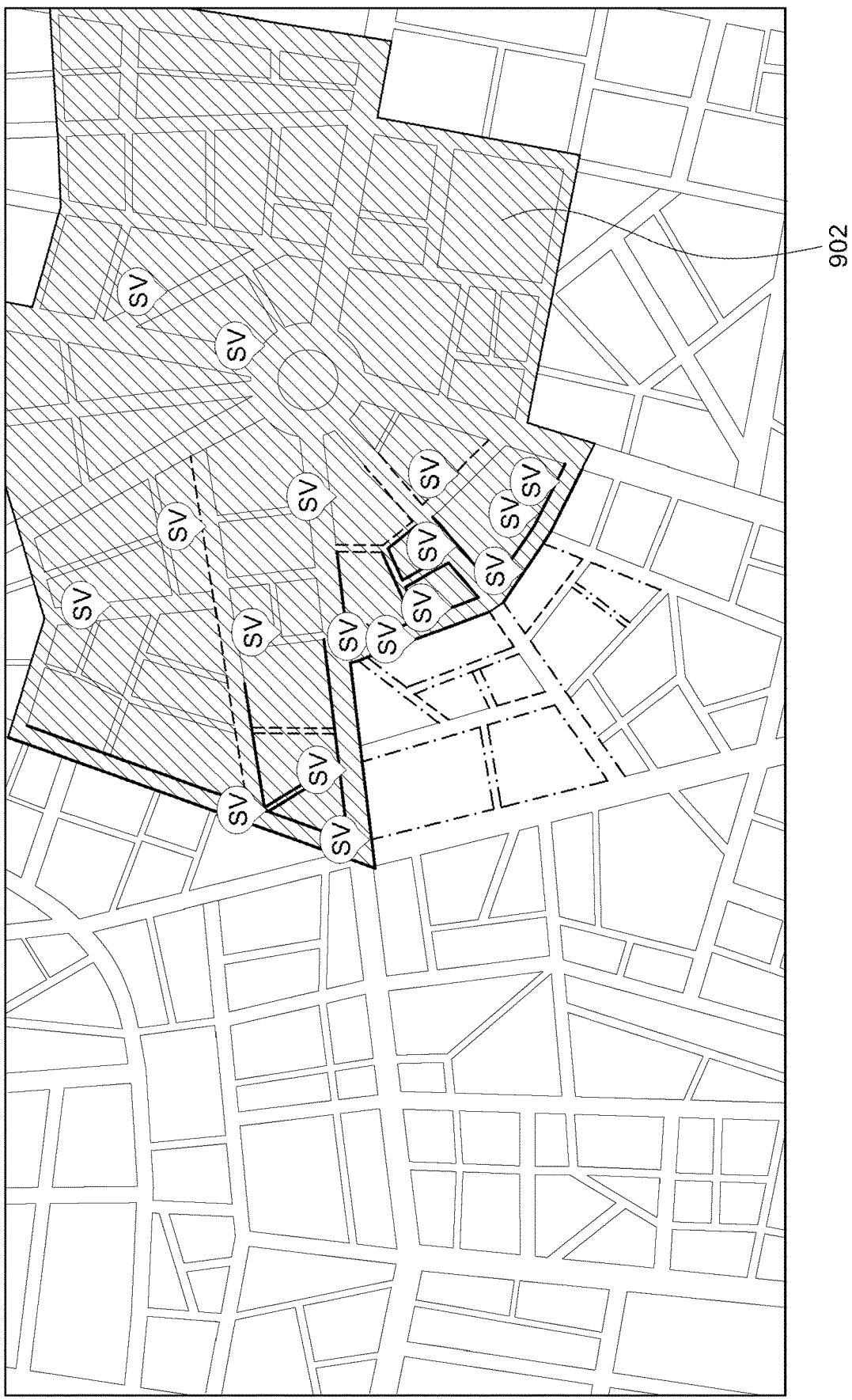
Figure 9B:
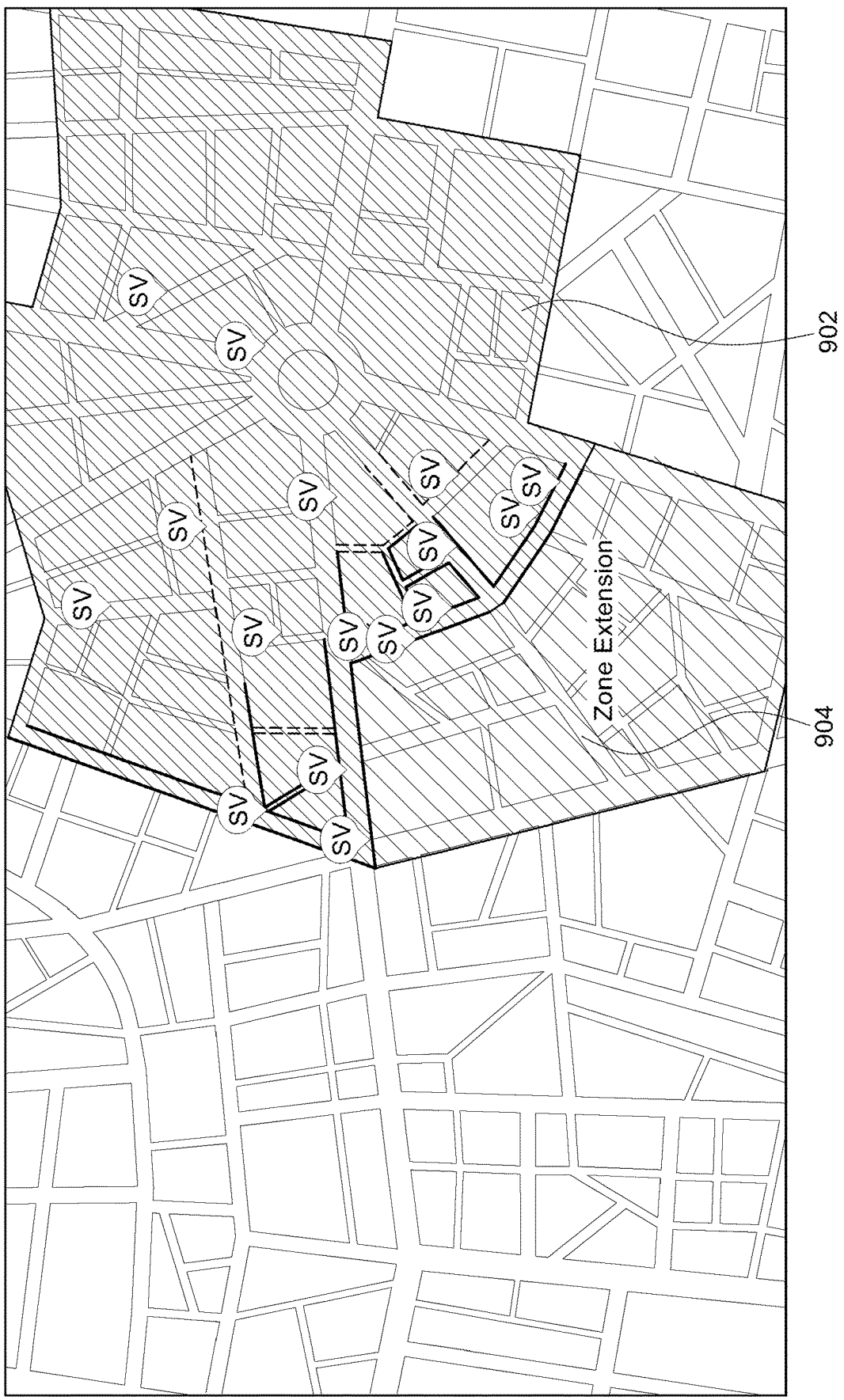
Figure 9C:
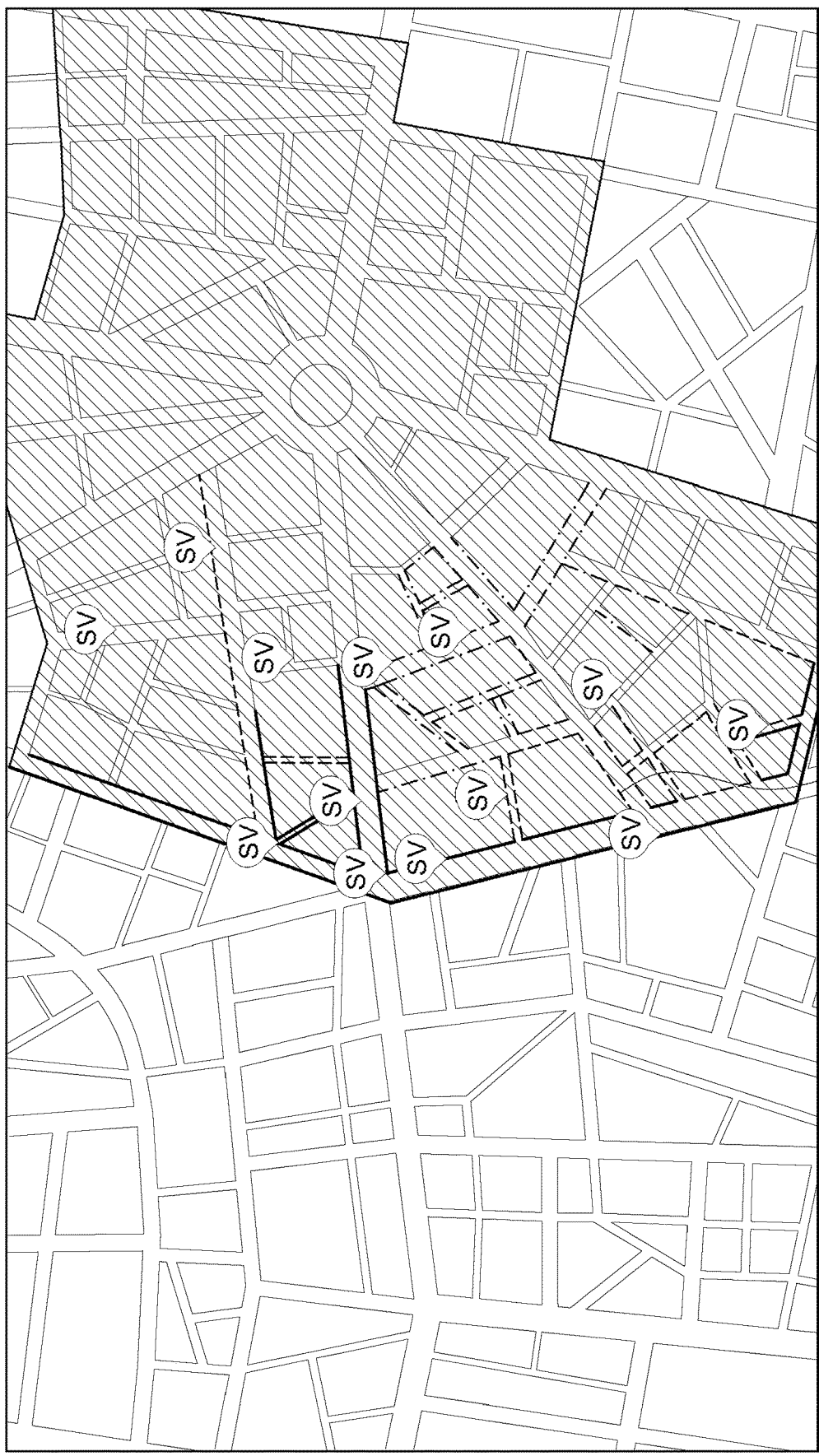
Figure 11:
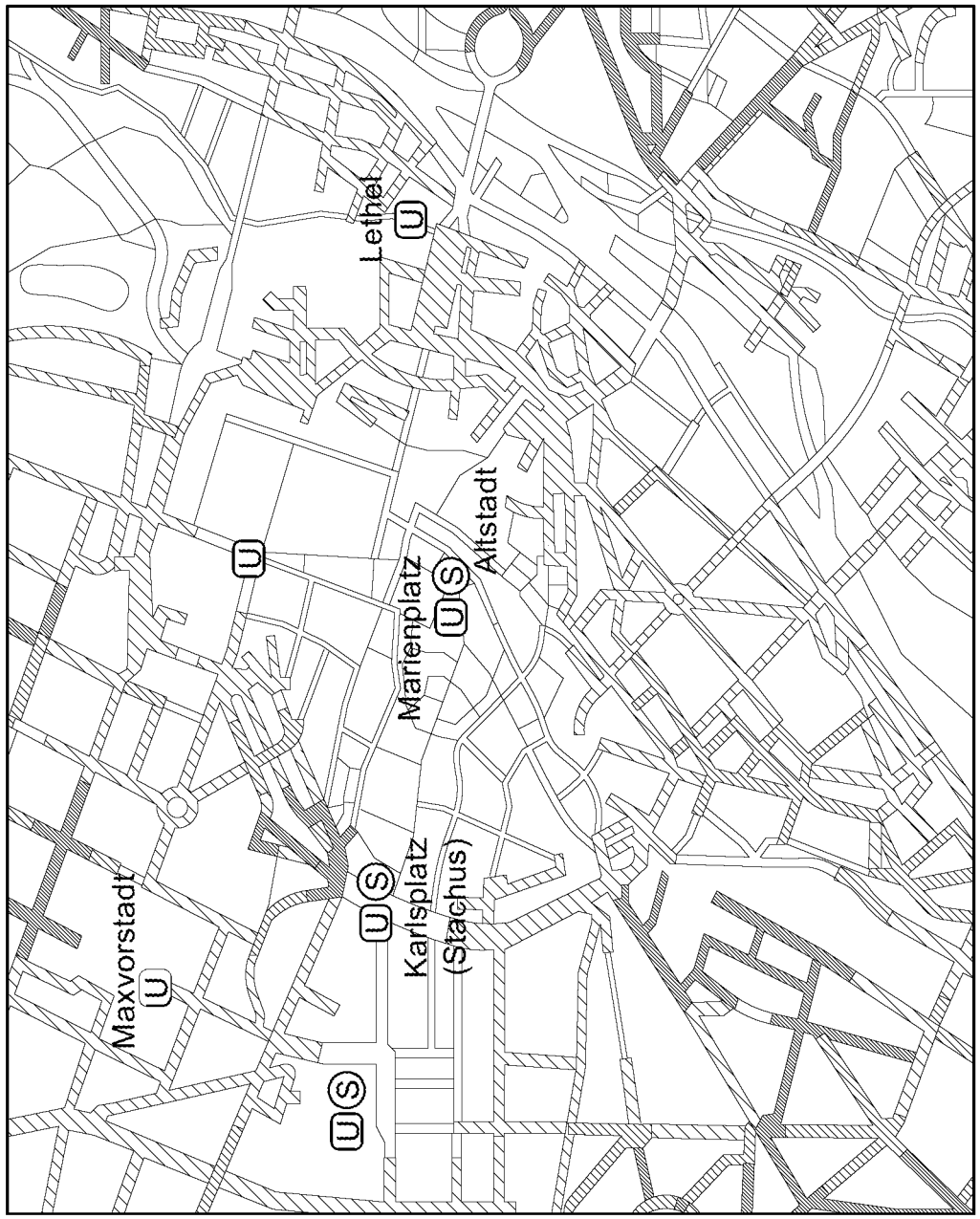
Figure 12:
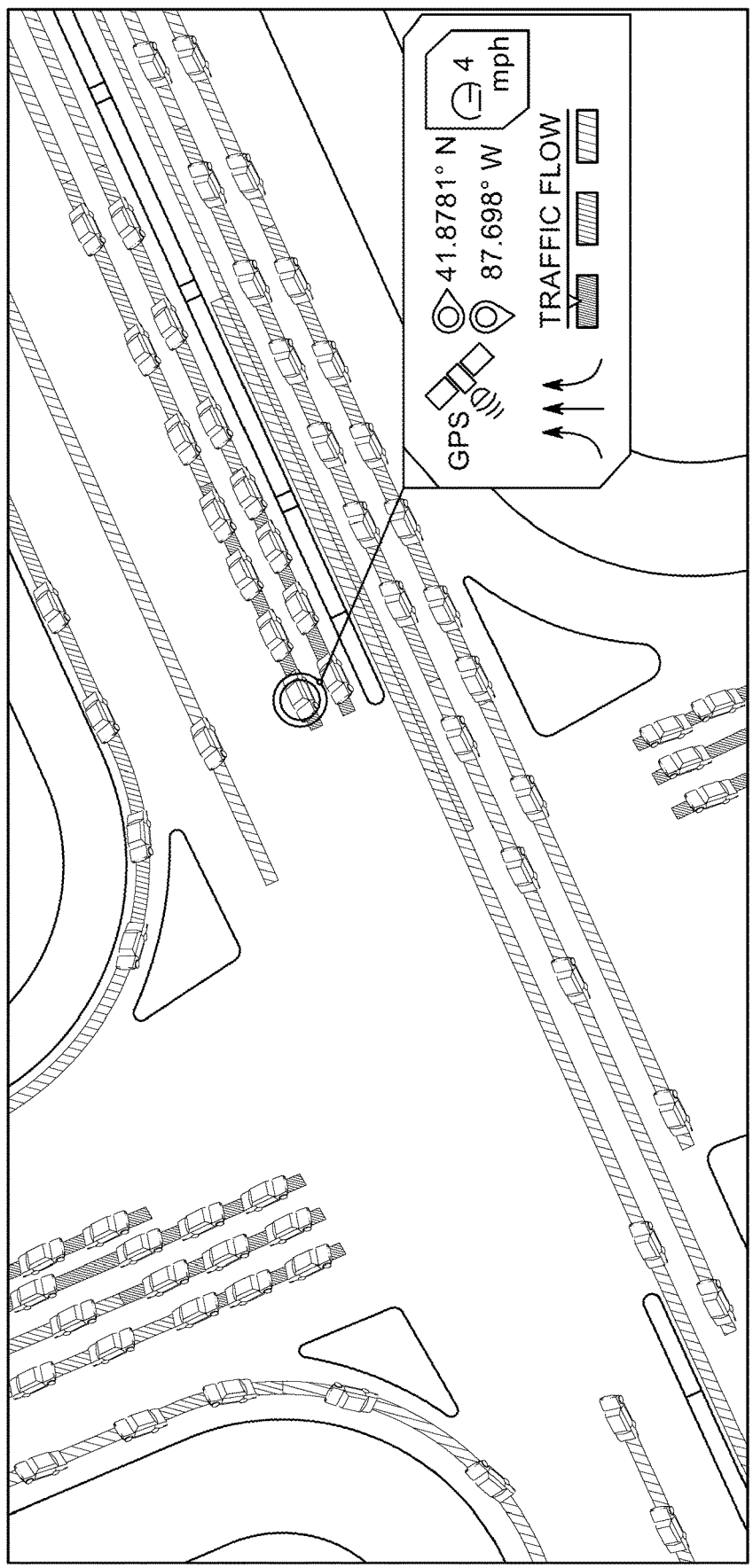
Figure 13:
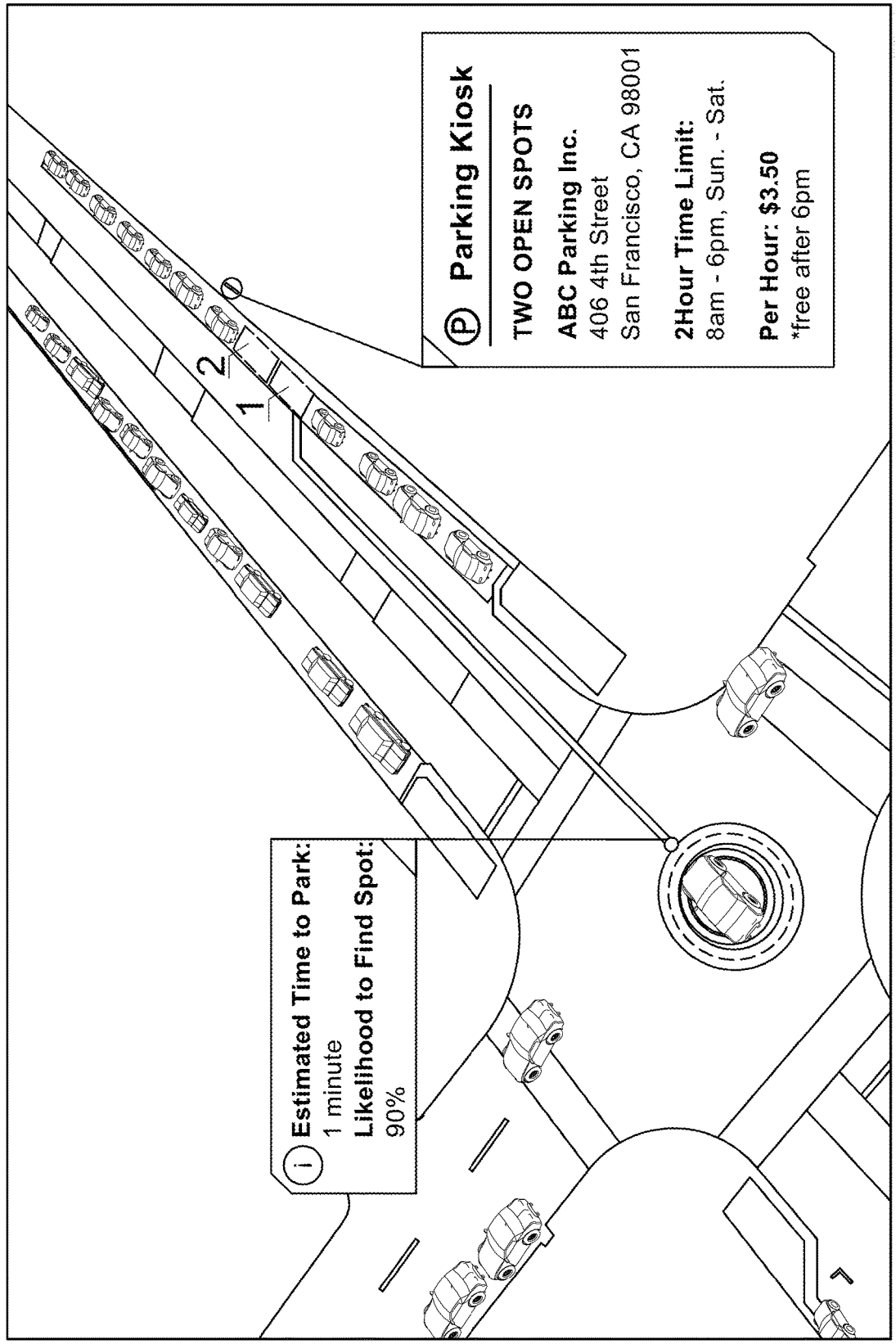

Having thus described example embodiments of the invention in general terms, reference will now be made to the accompanying drawings, which are not necessarily drawn to scale, and wherein:

FIG. 1 illustrates a schematic diagram of a system for providing on-street parking predictions, in accordance with an example embodiment;

FIG. 2 illustrates a block diagram of another embodiment of a system for providing on-street parking predictions, in accordance with an example embodiment;

FIG. 3 illustrates a block diagram of a mapping platform exemplarily illustrated in FIG. 2 that may be used to provide on-street parking predictions, in accordance with an example embodiment;

FIG. 4 illustrates a method for providing on-street parking predictions, in accordance with an example embodiment;

FIG. 5 illustrates a flow diagram of a method comprising steps for generating on-street parking predictions by a parking prediction model, in accordance with an example embodiment;

FIG. 6 illustrates a flow diagram of another method comprising steps for updating service boundary of a service area by a shared vehicle service provider based on recommendations provided by the parking prediction model, in accordance with an example embodiment;

FIGS. 7A-7C illustrate user interfaces showing service areas defined by the shared vehicle service providers, in accordance with example embodiments;

FIGS. 8A-8C illustrate user interfaces showing time-dependent parking patterns in service areas, in accordance with example embodiments;

FIGS. 9A-9C illustrate user interfaces showing impact of service boundaries on on-street parking predictions, in accordance with an example embodiment;

FIGS. 10A-10D illustrate user interfaces showing inter-modal connections to a destination enabled by change in service boundaries, in accordance with an example embodiment;

FIG. 11 illustrates user interface showing traffic data in different road links in a service area, in accordance with an example embodiment;

FIG. 12 illustrates user interface showing traffic data associated with vehicles of one or more shared vehicle service providers in a service area, in accordance with an example embodiment; and FIG. 13 illustrates user interface showing notifications showing notifications generated for assisting in parking of a vehicle, in accordance with an example embodiment.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. Also, reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced item. Moreover, various features are described which may be exhibited by some embodiments and not by others. Similarly, various requirements are described which may be requirements for some embodiments but not for other embodiments. As used herein, the terms "data," "content," "information," and similar terms may be used interchangeably to refer to data capable of being displayed, transmitted, received and/or stored in accordance with embodiments of the present invention. Thus, use of any such terms should not be taken to limit the spirit and scope of embodiments of the present invention.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Definitions

The term "link" may be used to refer to any connecting pathway including but not limited to a roadway, a highway, a freeway, an expressway, a lane, a street path, a road, an alley, a controlled access roadway, a free access roadway and the like.

The term "on-street parking predictions" may be used to refer to predictions associated with parking spots in the vicinity of links including but not limited to availability of parking spots, parking options at the available parking spots, traffic data in the vicinity of the parking spots, and estimation of time for parking in the available parking spots.

The term "service boundary" may be used to refer to a virtual perimeter of a service area defined by a shared vehicle service provider that defines a geographical region catered by a shared vehicle service provider. The service boundary may alternately define the geographical region as bounded by a geometrical shape such as a polygon shape; a circle; a shape delimited by road segments; a geofence and the like.

The term "service boundary geometry data" may be used to refer to data associated with the service boundary that defines a geometrical shape of a service area.

End of Definitions

A method, a system, and a computer program product are provided herein in accordance with an example embodiment for providing on-street parking predictions. One or more shared vehicle service providers may own vehicles that may be used by the users to navigate to their desired destinations. The shared vehicle service providers may define service areas for picking up or parking the vehicles by the users. Parking of the vehicles outside the service boundaries of the service areas may result in, such as, a heavy penalty being levied on the users and/or an obligation to continue paying the rental fee until the vehicle is returned, and/or an inability to end the rental period outside the service boundaries of the service areas. In some example embodiments, the service areas defined by one or more shared vehicle service providers may overlap with each other as exemplarily illustrated in FIGS. 7A-7C. The shared vehicle service providers may have to update and maintain the service boundaries of the service areas in a dynamic manner due to various reasons. One of the primary reasons to alter the service boundaries is general coverage expansion to cater for larger regions. Other reasons may include such as excluding some regions where there are problems, expanding to some regions where an additional demand is created by the users or by removal of competitors in those regions or by scheduled events located outside of the service area. However, the plans to alter the service boundaries of the service areas needs to be planned well in advance taking into account traffic conditions, on-street parking options, other transport options, parking restrictions, etc., available in the extended regions. Existing parking assistance systems provide parking predictions, such as, availability of parking spots, on-street or off-street, such as in garages, navigation routes to the available parking spots, etc., within a well-defined service area. The existing parking assistance systems however, lack the intelligence to adapt themselves to the dynamically changing service boundaries of the service areas. The parking restrictions in the service areas too are changed by the civic authorities based on need and the existing parking assistance systems lack the capability to adapt to these changes too. Accordingly, an automated approach is needed in providing parking predictions, especially for on-street parking, which is more likely to be affected by dynamic changes in the service boundaries of the service areas of shared vehicle service providers, while adapting to dynamically changing service boundaries of the service areas. Moreover, the shared vehicle service providers often alter the service boundaries without foreseeing the impact the change in service boundaries can have over various attributes of a service area and/or adjacent service areas. A method and a system that may gauge an impact of the change in service boundaries on conditions in service areas may also be needed.

FIG. 1 illustrates a schematic diagram of a system 100 that employs an automated approach for providing on-street parking predictions, in accordance with an example embodiment. The system 100 includes a user equipment (UE) or a user device 102, which may be in communication with a mapping platform 106, over a network 104. The network 104 may be wired, wireless, or any combination of wired and wireless communication networks, such as cellular, Wi-Fi, Internet, local area networks, or the like. The user equipment 102 may be a navigation system, that may be configured to provide route guidance and navigation related functions to the user of a vehicle. The user of the vehicle may drive the vehicle that may be rented out to the user by a shared vehicle service provider. The on-street parking predictions provided by the system 100 may be transmitted to the shared service vehicle provider and the shared service vehicle provider may provide parking related recommendations to the user of the vehicle. In some embodiments, the user equipment 102 may be installed in the vehicle and may be configured to provide on-street parking predictions to the user of the vehicle. The user equipment 102 may also include an image capturing device, such as a camera.

The user equipment 102 may include a mobile computing device such as a laptop computer, tablet computer, mobile phone, smart phone, navigation unit, personal data assistant, watch, camera, or the like. Additionally or alternatively, the user equipment 102 may be a fixed computing device, such as a personal computer, computer workstation, kiosk, office terminal computer or system, or the like. The user equipment 102 may be configured to access the mapping platform 106 via a processing component 110 through, for example, a user interface of a mapping application, such that the user equipment 102 may provide navigational assistance to the user among other services provided through access to the mapping platform 106.

As exemplarily illustrated, the mapping platform 106 may also include a map database 108, which may include node data, road segment data or link data, point of interest (POI) data, posted signs related data or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, for example, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may additionally include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) associated with the POI data records or other records of the map database 108 associated with the mapping platform 106. The map database 108 may additionally include service boundary geometry data for service boundaries defined by different shared vehicle service providers, data about traffic regulations, speed limits, posted traffic signs, posted speed limit signs, heading data and the like. The service boundary geometry data may comprise dimensions of different shapes defining geometries of various service areas, such as a polygon shape; a circle; a shape delimited by road segments; a geofence and the like. The service area boundaries may be specified using links, that is, a certain street may be a service boundary, and a concatenation of links may define an entire service boundary.

In some example embodiments, the map database 108 may additionally include historical sensor data, historical parking spot availability data, navigation routes within a service boundary, inter-modal connections available within a service boundary, historical traffic data in a service area, historical data about on-street parking spots and off-street parking spots in the service area, etc. The off-street parking spots are, for example, parking lots, underground garages, multi-story garages, etc. A content provider such as a map developer may maintain the mapping platform 106. In some example embodiments, a shared vehicle service provider may have access to the mapping platform 106 for accessing service boundary data. By way of example, the map developer can collect geographic data to generate and enhance the mapping platform 106. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Crowdsourcing of geographic map data can also be employed to generate, substantiate, or update map data. For example, sensor data from a plurality of data probes, which may be, for example, vehicles traveling along a road network or within a venue, may be gathered and fused to infer an accurate map of an environment in which the data probes are moving. Such sensor data may be updated in real time such as on an hourly basis, to provide accurate and up to date map data. The sensor data may be from any sensor that can inform a map database of features within an environment that are appropriate for mapping. For example, motion sensors, inertia sensors, image capture sensors, proximity sensors, LIDAR (light detection and ranging) sensors, ultrasonic sensors etc. The gathering of large quantities of crowd-sourced data may facilitate the accurate modeling and mapping of an environment, whether it is a road segment or the interior of a multi-level parking structure. Also, remote sensing, such as aerial or satellite photography, can be used to generate map geometries directly or through machine learning as described herein.

The map database 108 of the mapping platform 106 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the user equipment 102, for example. Further, data may be compiled relating to parking space availability along different road segments within a service area defined in the map database 108, where a parking availability estimation may be generated in dependence of time of day, day of week, season of the year, special events, service boundaries of the other shared vehicle service providers, etc. The navigation-related functions can correspond to vehicle navigation, pedestrian navigation, navigation to a favored parking spot or other types of navigation. While example embodiments described herein generally relate to vehicular travel and parking along roads, example embodiments may be implemented for bicycle travel along bike paths and bike rack/parking availability, boat travel along maritime navigational routes including dock or boat slip availability, off-street parking predictions, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

In some embodiments, the mapping platform 106 may be a master geographic database configured at a server side, but in alternate embodiments, a client side mapping platform 106 may represent a compiled navigation database that may be used in or with end user devices (e.g., user equipment 102) to provide navigation, speed adjustment and/or map-related functions. For example, the mapping platform 106 may be used with the end user device, that is, the user equipment 102 to provide the user with navigation features. In such a case, the mapping platform 106 can be downloaded or stored on the user equipment 102 which can access the mapping platform 106 through a wireless or wired connection, over the network 104.

In one embodiment, the user device or the user equipment 102 can be an in-vehicle navigation system, such as, an infotainment system, a personal navigation device (PND), a portable navigation device, a cellular telephone, a smart phone, a personal digital assistant (PDA), a watch, a camera, a computer, a workstation, and/or other device that can perform navigation-related functions, such as digital routing and map display. An end user can use the user equipment 102 for navigation and map functions such as guidance and map display, for example, and for determination of one or more personalized routes or route segments based on one or more calculated and recorded routes, according to some example embodiments. The shared vehicle service provider may be recommended by the mapping platform 106 on a user interface of the user equipment 102 to update the service boundaries based on time-dependent parking patterns that may emerge at the service boundaries on the user equipment. The shared vehicle service provider may be notified about updates in the service boundaries of the other shared vehicle service providers, availability of parking spots in the road links within the service boundaries, parking estimation times in the available parking spots in the road links, parking options in the available parking spots, and the like. The shared vehicle service provider may in turn communicate with the user of the vehicle over his/her personal device. In some embodiments, the user of the vehicle is notified by the mapping platform 106 about the changes in the service boundaries of the shared vehicle service provider and the user can use the user equipment 102, for example, the in-vehicle navigation system for navigation and map functions such as guidance and map display, for example, navigation routes in search of parking spots, according to some example embodiments. The user equipment 102 may include an application, for example, a mapping application with a user interface that may enable the user to access the mapping platform 106 for availing the functions disclosed above, such as for providing on-street parking predictions.

FIG. 2 exemplarily illustrates a block diagram of another embodiment of a system 200 for providing on-street parking predictions for assisting in parking of a vehicle 202 using a mapping platform 106. The system 200 includes a user equipment 102, including an application 204 with a user interface 206 for accessing one or more map and navigation related functions. The user equipment 102 may also include one or more sensors 208 such as a camera, an acceleration sensor, a gyroscopic sensor, a LIDAR sensor, a proximity sensor, a motion sensor and the like. The sensors 208 may primarily be used for determining positioning of the vehicle 202 and the sensors 208 may be built-in or embedded into or within interior of the user equipment 102. In some embodiments, the user equipment 102 uses communication signals for position determination. The user equipment 102 may receive location data from a positioning system, a Global Navigation Satellite System, such as Global Positioning System (GPS), Galileo, GLONASS, BeiDou, etc., cellular tower location methods, access point communication fingerprinting such as Wi-Fi or Bluetooth based radio maps, or the like. The data collected by the sensors 208 may be used to gather information related to an environment of the vehicle 202. In some embodiments, the vehicle 202 may have sensors positioned on or within and the sensors 208 may provide data indicating a location of the vehicle 202. Vehicle data, also referred to herein as "probe data", may be collected by any device capable of determining the necessary information, and providing the necessary information to a remote entity. The user equipment 102 is one example of a device that can function as a probe to collect probe data of a vehicle 202.

More specifically, probe data collected by the user equipment 102 may be representative of the location of a vehicle 202 at a respective point in time and may be collected while a vehicle 202 is traveling along a route. While probe data is described herein as being vehicle probe data, example embodiments may be implemented with pedestrian probe data, marine vehicle probe data, or non-motorized vehicle probe data (e.g., from bicycles, skate boards, horseback, etc.). According to the example embodiment described below with the probe data being from motorized vehicles traveling along roadways, the probe data may include, without limitation, location data, (e.g. a latitudinal, longitudinal position, and/or height, GNSS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The user equipment 102, may be any device capable of collecting the aforementioned probe data. In one example, sensors may also be installed at the parking spots and on the road links within the service area defined by the service boundary. In one example, using the sensor data from the user equipment 102, service boundary geometry data, and sensor data from the on-street parking spots, a mapping platform 106 similar to the mapping platform exemplarily illustrated in FIG. 1, may generate on-street parking predictions to assist the vehicle 202 to park in an available on-street parking spot. The processing of the sensor data to generate the on-street parking predictions are performed by a parking prediction module 306 of the mapping platform 106 exemplarily illustrated in FIG. 3. The parking prediction module 306 may be embodied in a processor 304, exemplarily illustrated in FIG. 3, which is same as a processing component 110 exemplarily illustrated in FIG. 1.

The system 200 may further include a services platform 210, which may be used to provide navigation related functions and services 212a-212i to the application 204 running on the user equipment 102. The services 212a-212i may include such as navigation functions, speed adjustment functions, traffic related updates, weather related updates, warnings and alerts, parking related services, indoor mapping services and the like. The services 212a-212i may be provided by a plurality of content providers 214a-214k. In some examples, the content providers 214a-214k may access various SDKs from the services platform 210 for implementing one or more services. In an example, the services platform 210 and the mapping platform 106 may be integrated into a single platform to provide a suite of mapping and navigation related applications for OEM devices, such as the user equipment 102. The user equipment 102 may be configured to interface with the services platform 210, the content provider's services 214a-214k, and the mapping platform 106 over a network 104. Thus, the mapping platform 106 and the services platform 210 may enable provision of cloud-based services for the user equipment 102, such as, for providing on-street parking predictions to the shared vehicle service provider of the vehicle 202 carrying the user equipment 102.

FIG. 3 exemplarily illustrates a block diagram of the mapping platform 106 that may be used to provide on-street parking predictions, in accordance with an example embodiment of the present invention. In the embodiments described herein, the mapping platform 106 comprises a data communication module 302, a parking prediction module 306, and a user interface module 308. In this embodiment exemplarily illustrated in FIG. 3, the parking prediction module 306 is embodied within a processor 304. The processor 304 may retrieve computer program code instructions that may be stored in a memory 310 for execution of the computer program code instructions by the modules 302, 306, and 308 of the mapping platform 106. The processor may control the execution of the computer program code instructions by the modules 302, 306, and 308 of the mapping platform 106. In one embodiment, the data communication module 302 communicates with the sensors 208 disclosed in the detailed description of FIG. 2 and receives the sensor data from the sensors 208 and service boundary geometry data from the shared vehicle service providers. In an embodiment, the sensors may be installed at the service boundary of a service area of a shared vehicle service provider and the sensors periodically transmit service boundary geometry data of the service boundary to the mapping platform 106 over the network 104. The service area catered by a shared vehicle service provider can be of various shapes, for example, a polygon shape, a circle, etc. In one example, the shape of the service area is defined by road links. In other examples, the shape of the service area may be defined virtually by a geo-fence created by the shared vehicle service provider in their area of interest. In some example embodiments, the data communication module 302 may also receive destination information of a user of the vehicle 202 via the network 104. The data communication module 302 can also receive values for number of vehicles in a service area at a point in time and traffic data in the service area from an external system, for example, a traffic control system. From the sensors installed in the parking spots and in communication with a navigation assistance system of the shared vehicle service provider, the data communication module 302 may also receive parking spot availability data at a point in time. The data communication module 302 may receive sensor data configured to describe a position of the user equipment 102 installed in the vehicle 202, or a controller of the user equipment 102 may receive the sensor data from the positioning system of the user equipment 102. The data inputted to the mapping platform 106, for example, the sensor data, the service boundary geometry data, etc., is transformed, processed, and executed upon by the mapping platform 106 to provide on-street parking predictions to a user of the vehicle 202. The sensor data from the different sensors installed in the user equipment 102 or the vehicle 202 may be converted to units and ranges compatible with the mapping platform 106, to accurately provide on-street parking predictions.

In some example embodiments, the parking prediction module 306 may generate on-street parking predictions based on the received sensor data and the received service boundary geometry data. In some example embodiments, the processor 304 may generate the on-street parking predictions based on the received sensor data and the received service boundary geometry data. In an embodiment, the service boundary geometry data may be varied by the shared vehicle service provider based on a time-dependent parking pattern adjacent to a previously defined service boundary. The "time-dependent parking patterns" relate to the phenomenon of finding more vehicles parked at edges of the service area or at the service boundary in an evening of a day. The time-dependent parking patterns which may occur at the borders of the service area are demand-driven. That is, during the day, there may be more demand for vehicles to travel towards center of the service area, as center of the service area may coincide with a city center, and during the nights, there may be a higher demand to drive back towards the borders. Also, the time-dependent parking patterns may again be based on at least one load balancing model of vehicles of the shared vehicle service providers in the service area. The "load balancing model" refers to a mechanism implemented by the shared vehicle service providers to distribute vehicles at different regions within the service area based on the demand for the vehicles at the regions. In an example, the shared vehicle service providers perform load balancing of the vehicles by discounting rental fees for vehicles whose destination is or towards a region in the service area where there is high demand but no availability of vehicles. The load balancing models may be used to determine number of vehicles that would be present in a service area, which in turn would affect the parking pattern or density of the vehicles at the service boundary. In some example embodiments, the load balancing models may be taken into account by the parking prediction module 306 for generating the on-street parking predictions using the mapping platform 106. In one example, the service boundary of a shared vehicle service provider may be changed temporally for, such as, a week, a day or few hours in a day, etc., by one of the shared vehicle service providers. Service boundary changes made by the shared vehicle service providers may be less frequent. Temporal changes in the service boundaries may happen if the service area is extended to, for example, cover an event.

In an embodiment, the parking prediction module 306 may employ a candidate machine learning model that may be trained to generate the on-street parking predictions. The parking prediction module 306 may include processing instructions for training of the candidate machine learning model with training data comprising the sensor data, that may be real-time data or historical data, from the vehicle 202 and the parking spots and the service boundary geometry data from the shared vehicle service providers, destination information of the user from the shared vehicle service providers, and navigation routes within a service area from the map database 108 and corresponding on-street parking prediction. In one embodiment, the data communication module 302 may further receive historical availability of parking spots within the service area, historical parking estimation times in the available parking spots, and historical parking options in the available parking spots in the service area from the map database 108 as a part of the training data. In an embodiment, the training data may be divided into two sets, a training data set for training the candidate machine learning model, and a validation data set for validating the trained machine learning model to determine an accuracy of the trained machine learning model. In some example embodiments, the parking prediction module 306 may employ statistical models using logistic regression approach, time series analysis approach and the like to generate on-street parking predictions based on observations drawn and inferences made from historical data, such as the sensor data, the service boundary geometry data, etc., and historical on-street parking predictions. The parking prediction module 306 may generate a trained machine learning model or a parking prediction model that generates on-street parking predictions for an input at substantially real-time.

In one embodiment, the parking prediction module 306 uses a training data set for training the candidate machine learning model to provide the on-street parking predictions. For an input in the training data set, the parking prediction module 306 trains the candidate machine learning model to generate a corresponding on-street parking prediction. For example, for a combination of the sensor data, the service boundary geometry data, and destination information of the user, the parking prediction module 306 trains the candidate machine learning model to output parking spots available, parking options at the available parking spots, etc. In an embodiment where the service boundary of the service area is altered, the parking prediction module 306 may be configured to train the trained machine learning model with the dynamically updated service boundary geometry data to update the on-street parking predictions.

In some example embodiments, the candidate machine learning model may be an artificial neural network, a random forest model, decision trees, Naive Bayes model, Support Vector Machines, etc. Post training, in one embodiment, the parking prediction module 306 may validate the trained machine learning model by providing a validation data set as an input. The validation data set, for example, may include combinations of the sensor data, the service boundary geometry data, and destination information of the user, whose corresponding on-street parking predictions are not fed to the trained machine learning model. The trained machine learning model may be configured to output corresponding on-street parking predictions. The parking prediction module 306 may be aware of correct corresponding on-street parking predictions for the different combinations of the sensor data, the service boundary geometry data, and destination information of the user and the parking prediction module 306 may compare the output of the trained machine learning model to the validation data set with the correct on-street parking predictions. The parking prediction module 306 may evaluate the accuracy of the trained machine learning model. In one embodiment, if the accuracy of the trained machine learning model is less than a threshold value, the parking prediction module 306 may re-train the trained machine learning model and a trained machine learning model with an improved accuracy is generated.

In an embodiment, the parking prediction module 306 may re-train or update the trained machine learning model or the parking prediction model based on at least one load balancing model of the vehicles of the shared vehicle service providers since the service boundary geometry data is associated with the time-dependent parking pattern and the time dependent parking pattern is based on the load balancing model of the vehicles. As the vehicles are displaced in and around the service area, the on-street parking predictions, for example, the availability of parking spots in the service area indicated by the trained machine learning model or the parking prediction model may be erroneous and the parking prediction module 306 may retrain the trained machine learning model or the parking prediction model.

In one embodiment, the parking prediction module 306 may receive the sensor data, the service boundary geometry data, and destination information of the user in substantially real-time from the data communication module 302 and the parking prediction module 306 may train the trained machine learning model in substantially real-time. For a combination of the sensor data, the service boundary geometry data, and destination information of the user, the parking prediction module 306 may provide on-street parking predictions including recommendations on parking and intermodal parking search routes to be rendered on the user interface 206 of the user equipment 102. The parking prediction module 306, in an embodiment, may provide recommendations on parking and the intermodal parking search routes based on time of day. In an embodiment, the parking prediction module 306 may suggest a change in the service boundary geometry data based on parking impact data. The parking impact data refers to data associated with various factors that may have an effect on availability of an on-street parking spot in the service area and parking search routes feasible to navigate to available on-street parking spots. The parking prediction module 306 may suggest extension or shortening in the service boundary of the service areas based on the parking impact data. The parking impact data may comprise time of day, number of vehicles within a service boundary, pollution causing events within the service boundary, occurrence of fairs within the service boundary, and traffic data within the service boundary.

In an embodiment, the parking prediction module 306 may provide the shared vehicle service providers with recommendations on parking and intermodal navigation routes based on a destination of the user. In this embodiment, the recommendation on parking may include an index for likelihood of finding parking spots in the service area defined by the updated service boundary geometry data, availability of parking spots, may be off-street parking spots or on-street parking spots, parking options at the available parking spots, etc. In some example embodiments, the parking prediction module 306 may recommend intermodal navigation routes based on availability of alternate modes of transport within a service boundary and/or outside the service boundary to the destination of the user. The alternate modes of transport may refer to the vehicles that do not require on-street parking. The availability of alternate modes of transport may include availability of public transport stations, mobility hubs of vehicles, etc. For the purpose of the invention, a mobility hub may refer to an aggregation of vehicles of different modes of transport operated by multiple shared vehicle service providers for facilitating intermodal navigation. In some embodiments, the parking prediction module 306 provides recommendations to the user of the vehicle 202 apart from or along with providing the recommendations to the shared vehicle service providers.

The user interface module 308 may render the generated on-street parking predictions on the user interface 206 of the user equipment 102. In an embodiment, when the on-street parking predictions are updated by the parking prediction model based on modifications in the service boundary geometry data, the user interface module 308 may update the rendered on-street parking predictions. The different representations of the on-street parking predictions may be in the form of a map of the service area with color coded or patterned road links and parking spots as exemplarily illustrated in FIGS. 9A-9C, a list of street segments or road links where parking spots are available, a tabular representation of the likelihood of finding a parking spot in different road links in the service area, available parking spots in the road links, estimated time for parking the vehicle 202 in the available parking spots, etc. In an embodiment, the user interface module 308 may receive destination information of the user of the vehicle 202 from the user on the user interface 206 of the user equipment 102. In some example embodiments, the user interface module 308 may notify the shared vehicle service providers or the users of the vehicles 202 via the user interface 206 of the user equipment 102 about changes in the service boundaries. In some example embodiments, the user interface module 308 can render recommendations for updating the service boundary geometry data of the shared vehicle service providers based on parking impact data. In some example embodiments, the user interface module 308 renders the notification about changes in service boundaries and impact of the modified service boundaries on parking situations in the service areas, in mobile applications or navigation applications used by the users. The user interface module 308 may be configured to update the rendered recommendations on receiving control instructions from the processor 304.

The processor 304 may be embodied in a number of different ways. For example, the processor 304 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 304 may include one or more processing cores configured to perform independently. A multi-core processor may enable multiprocessing within a single physical package. Additionally or alternatively, the processor 304 may include one or more processors configured in tandem via the bus to enable independent execution of instructions, pipelining and/or multithreading. Additionally or alternatively, the processor 304 may include one or processors capable of processing large volumes of workloads and operations to provide support for big data analysis.

In an example embodiment, the processor 304 may be in communication with a memory 310 via a bus for passing information among components of the system 200. The memory 310 may be non-transitory and may include, for example, one or more volatile and/or non-volatile memories. In other words, for example, the memory 310 may be an electronic storage device (for example, a computer readable storage medium) comprising gates configured to store data (for example, bits) that may be retrievable by a machine (for example, a computing device like the processor 304). The memory 310 may be configured to store information, data, content, applications, instructions, or the like, for enabling the apparatus to carry out various functions in accordance with an example embodiment of the present invention. For example, the memory 310 could be configured to buffer input data for processing by the processor 304. As exemplarily illustrated in FIG. 3, the memory 310 could be configured to store instructions for execution by the processor 304. As such, whether configured by hardware or software methods, or by a combination thereof, the processor 304 may represent an entity (for example, physically embodied in circuitry) capable of performing operations according to an embodiment of the present invention while configured accordingly. Thus, for example, when the processor 304 is embodied as an ASIC, FPGA or the like, the processor 304 may be specifically configured hardware for conducting the operations described herein. Alternatively, as another example, when the processor 304 is embodied as an executor of software instructions, the instructions may specifically configure the processor 304 to perform the algorithms and/or operations described herein when the instructions are executed. However, in some cases, the processor 304 may be a processor specific device (for example, a mobile terminal or a fixed computing device) configured to employ an embodiment of the present invention by further configuration of the processor 304 by instructions for performing the algorithms and/or operations described herein. The processor 304 may include, among other things, a clock, an arithmetic logic unit (ALU) and logic gates configured to support operation of the processor 304.

In some embodiments, the processor 304 may be configured to provide Internet-of-Things (IoT) related capabilities to users of the system 200 disclosed herein. The IoT related capabilities may in turn be used to provide smart city solutions by providing real time parking updates, big data analysis, and sensor based data collection by using the cloud based mapping platform 106 for providing navigation and parking recommendation services. In some embodiments, the mapping platform 106 may be configured to provide an environment for development of parking strategy recommendation solutions for navigation systems in accordance with the embodiments disclosed herein. The environment may be accessed using the user interface module 308 of the mapping platform 106 disclosed herein. The user interface module 308 may provide an interface for accessing various features and data stored in the mapping platform 106.

In some embodiments, the mapping platform 106 may be configured to provide a repository of algorithms for implementing a plurality of location based services for navigation systems. For example, the mapping platform 106 may include algorithms related to geocoding, routing (multimodal, intermodal, and unimodal), machine learning in location based solutions, natural language processing algorithms, artificial intelligence algorithms, parking prediction algorithms, machine learning and dedicated algorithms to identify impact of changes in service boundary geometry data, and the like. The data for different modules of the mapping platform 106 may be collected using a plurality of technologies including but not limited to drones, sensors, connected cars, cameras, probes, chipsets and the like. The collected data may be processed by the processor to generate parking predictions according to the embodiments disclosed herein. As noted above, the mapping platform 106 may be embodied by the processing component. However, in some embodiments, the mapping platform 106 may be embodied as a chip or chip set. In other words, the mapping platform 106 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The mapping platform 106 may therefore, in some cases, be configured to implement an example embodiment of the present invention on a single "system on a chip." As such, in some cases, a chip or chipset may constitute a means for performing one or more operations for providing the functionalities described herein.

The user interface 206 of the user equipment 102 may in turn be in communication with the processor 304 to provide output to the user and, in some embodiments, to receive an indication of a user input. In some example embodiments, the system 200 may include a user interface that communicates with the processor 304 and displays input and/or output of the mapping platform 106. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor 304 may comprise user interface circuitry configured to control at least some functions of one or more user interface elements such as a display and, in some embodiments, a plurality of speakers, a ringer, one or more microphones and/or the like. The processor 304 and/or user interface circuitry comprising the processor 304 may be configured to control one or more functions of one or more user interface elements through computer program instructions (for example, software and/or firmware) stored on a memory accessible to the processor 304 (for example, memory device 310, and/or the like). In some example embodiments, the processor 304 may be configured to provide a method for providing on-street parking predictions as will be discussed in conjunction with FIG. 4 as below.

FIG. 4 exemplarily illustrates a method 400 for providing on-street parking predictions, in accordance with an example embodiment. It will be understood that each block of the flow diagram 400 of the method may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 310 of an apparatus, such as the user equipment 102, or the mapping platform 106, employing an embodiment of the present invention and executed by a processor 304 of the apparatus. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory 310 that may direct a computer or other programmable apparatus to function in a particular manner, such that the instructions stored in the computer-readable memory 310 produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram 400 support combinations of means for performing the specified functions and combinations of operations for performing the specified functions for performing the specified functions. It will also be understood that one or more blocks of the flow diagram 400, and combinations of blocks in the flow diagram 400, can be implemented by special purpose hardware-based computer systems which perform the specified functions, or combinations of special purpose hardware and computer instructions. A method illustrated by the flow diagram 400 of FIG. 4 for providing on-street parking predictions includes, at 410, receiving service boundary geometry data from one or more shared vehicle service providers. The service boundary geometry data may be received from the sensors installed at the service boundaries or from the shared vehicle service providers. At 420, the method 400 may include providing on-street parking predictions, based on the received service boundary geometry data of the shared vehicle service providers by the processor 304. A parking prediction model developed by the processor 304 generates the on-street parking predictions as disclosed in the detailed description of FIG. 3. The method 400 may further include, at 430, rendering a representation of the on-street parking predictions on a user interface of a user device or a user equipment 102. For example, the method 400 may include generating the on-street parking predictions by training a candidate machine learning model using historical sensor data from vehicles of the shared vehicle service providers, real-time sensor data from the vehicles of the shared vehicle service providers, parking spot availability data, destination information of a user of a vehicle, and/or navigation routes within the service boundary. The method 400 may include notifying via the user device or the user equipment 102 by the processor 304 about at least one of changes in service boundaries, availability of parking spots in road links within the service boundaries, parking estimation times in available parking spots in the road links, and parking options in the available parking spots in the road links.

In an example embodiment, a system for performing the method of FIG. 4 above may comprise a processor (e.g. the processor 304) configured to perform some or each of the operations (410-430) described above. The processor may, for example, be configured to perform the operations (410-430) by performing hardware implemented logical functions, executing stored instructions, or executing algorithms for performing each of the operations. Alternatively, the system may comprise means for performing each of the operations described above. In this regard, according to an example embodiment, examples of means for performing operations 410-430 may comprise, for example, the processor 304 and/or a device or circuit for executing instructions or executing an algorithm for processing information as described above.

On implementing the method 400 disclosed herein, the end result generated by the mapping platform 106 is a tangible determination of on-street parking predictions. The on-street parking predictions generated are based, at least in part, on the service boundary geometry data. The mapping platform 106 may generate the on-street parking predictions based on the sensor data, list of parking spots, may be on-street parking spots or off-street parking spots, in the map database 108, destination information of the user, etc., as described above. The mapping platform 106 allows users, that is, drivers of the vehicles via the shared vehicle service providers to obtain accurate parking related recommendations and assistance for parking based on impact of the vehicles being returned at edges of the service areas. The mapping platform 106 generates likelihood of finding a parking spot as a part of the on-street parking predictions. A measure of likelihood of finding a parking spot avoids congestion on the road links, wastage of time of the users, and pollution in the service areas. The parking options available at the parking spots are also presented to the user of the vehicle which allows the user to decide proactively whether to park at the available parking spot or not to park. The mapping platform 106 also suggests to the shared vehicle service providers to update the service boundaries based on observing the time-dependent trends of parking of the vehicles in the service areas. In some embodiments, the mapping platform 106 also gauges the impact of the change in the service boundary geometry data on traffic congestion in the service, profitability to the shard vehicle service provider, etc., and suggests adjustments in the service boundary geometry data.

The method disclosed herein provides an improvement in computer related technology related to parking assistance as follows: The mapping platform 106 employs the service boundary geometry data in generating the on-street parking predictions. The service boundary geometry data is updated by the shared vehicle service providers dynamically on the basis of various reasons, for example, coverage expansion of the shared vehicle service providers, occurrence of some specific events that benefit from the expansion or shortening of the service boundaries, exclusion of some service areas where there are problems, increasing number of vehicles where there is more demand created by the users or by removal of other shared vehicle service providers, etc. The shared vehicle service providers often lack the ability to gauge the dynamic impact of the change in the service boundary geometry data in the service area. The mapping platform 106 suggests dynamic changes in the service boundary geometry data to the shared vehicle service providers while taking into account variables, such as, traffic in the service area, parking in the service area, public transport layout in the service area, other transport options available in the service area, etc. The mapping platform 106 considers service boundary geometry data of other shared vehicle service providers and other zones within or in the vicinity of the service area. Some examples of the different zones in the service area are EV only zone, diesel exclusion zone, no parking zone, no car zone, park zone, etc. Changing the service boundaries of these zones has an impact on aspects such as, urban life, parking, traffic, etc., in the service areas and the mapping platform, based on these impacts, suggests changes or adjustments to the service boundaries of the shared vehicle service provider employing the mapping platform 106. The shared vehicle service providers are no longer needed to wait for days to witness the impact of the changes in the service boundaries since the mapping platform 106 updates the parking predictions dynamically.

In some embodiments, the mapping platform 106 also considers competitive offerings of other shared vehicle service providers, pollution levels within the service area, vehicle distribution within the service area, reachability of the vehicles to different road links within the service area, etc., in providing on-street parking predictions. The mapping platform 106 aids in deploying vehicles or parking assistance solutions that do not have to be rolled back due to unexpected or unforeseen side effects. The mapping platform 106 helps in optimization of the deployment of vehicles in the service area by simulating situations where vehicles are more likely to be returned. The mapping platform 106 also fosters synergies across different shared vehicle service providers by providing better understanding of the value created by possible overlap of the service areas and ensuring the existing users of the vehicles of a service provider do not migrate to the other shared vehicle service providers. In the process of determining parking search routes, the mapping platform 106 intelligently prefers the road links with many vehicles which are most likely to leave. The mapping platform 106 also considers the time of day in implementing various parking strategies in recommending multiple navigation routes to parking spots within the service areas since, late at night, finding on-street parking spots at the edge of the service area is difficult.

The recommendations in updating the service boundary geometry data are provided by the mapping platform 106 on the basis of inter-modal connections available from the service area to destinations of the users. The system employing the mapping platform 106 finds application in general parking zone management in cities, traffic management in service areas catered by one or more shared vehicle service providers, and autonomous vehicle parking. The mapping platform 106 may also provide other variations of the method for providing parking assistance related functions, as will be discussed in conjunction with the description of the method of FIG. 5 as below.

FIG. 5 exemplarily illustrates a flow diagram 500 of a method comprising steps for generating on-street parking predictions by a parking prediction model, in accordance with an example embodiment. In step 510, a parking prediction model in a certain service area based on parameters such as, sensor data, destination information of the user, etc., is computed by the processor 304 as disclosed in the detailed description of FIG. 3. In step 520, for a service area, the processor 304 receives modification in service boundary geometry data and the processor complements the parking prediction model with the modified service boundary geometry data of the service area. In step 530, the parking prediction model is updated with the modified service boundary geometry data. That is, the parking prediction model or the machine learning model computed in step 510 is trained or updated with service boundary geometry data and a trained machine learning model or an updated parking prediction model is generated to provide on-street parking predictions. The parking prediction model, at step 540, provides on-street parking predictions based on time-dependent parking patterns as disclosed in the detailed description of FIG. 3. The dynamically updated parking prediction model provides recommendations on intermodal navigation routes, that is, parking search routes in-line with zone dynamics at the service boundaries of the service areas to the users.

FIG. 6 illustrates a flow diagram 600 of another method comprising steps for updating service boundary of a service area by a shared vehicle service provider based on recommendations provided by the parking prediction model, in accordance with an example embodiment. In step 610, the processor 304 may determine that the shared vehicle service provider intends to modify current service boundaries. In step 620, the shared vehicle service provider inputs the new service boundaries of the service area to the parking prediction model. That is, the parking prediction model updated in step 530 of the flow diagram exemplarily illustrated in FIG. 5 receives modification in the service boundary geometry data. At step 630, the parking prediction model provides recommendations for updating the service boundaries based on parking impact data. The processor obtains parking impact data and based on the parking impact data, such as, traffic data, parking availability data, etc., provides feedback to the shared vehicle service provider on the impact of the changes in the service boundaries. Based on input of the shared vehicle service provider to the feedback provided, at step 640, the parking prediction model provides further recommendations for updating the service boundaries. If the impact of the changes in the service boundaries seems negative to the shared vehicle service provider, the parking prediction model computes recommended adjustments to the new service boundaries which could have less impact on the traffic and parking in the service area.

FIGS. 7A-7C illustrate user interfaces showing service areas 702, 704, 706, 708, and 710 defined by the shared vehicle service providers, in accordance with example embodiments. As exemplarily illustrated, each of the service areas 702, 704, 706, 708, and 710 refers to the geographical regions within which each of the shared vehicle service providers operate. The service area 706 is catered by an electric scooter sharing service provider, the service area 704 is catered by a car sharing service provider, and the like. The service areas of the shared vehicle service providers, as exemplarily illustrated, may overlap to a certain extent. In different regions in a city, for example, Berlin, the shared vehicle service provider may cater to more than one service area as exemplarily illustrated in FIG. 7A and FIG. 7C. The car sharing service provider operates in another service area 710 in Berlin, apart from the service area 704. The boundary of the service area 702, 704, 706, 708, or 710 is the service boundary that limits the region of operation of the shared vehicle service provider. The vehicles may be parked at on-street parking spots within the service boundaries. The user interfaces illustrated in FIGS. 7A-7C may be rendered on the user equipment of the shared vehicle service provider.

FIGS. 8A-8C illustrate user interfaces showing time-dependent parking patterns in service areas 802, 804, and 806, in accordance with example embodiments. As exemplarily illustrated, the shared vehicle service providers define service areas 802, 804, and 806 by limiting the service boundaries. On the user interfaces, the vehicles are observed to be parked at edges of the service areas 802, 804, and 806 based on time of day, weather conditions, destination of the users, etc. For example, the vehicles may often be found parking at the edges of the service area late at night. Many users of the vehicles living outside the service areas 802, 804, and 806 may need to drive until the limit of the service areas and park the vehicles at the edges of the service areas 802, 804, and 806. From the edges of the services areas 802, 804, and 806, the users may make use of public transportation, private vehicle, or other modes of transport. In some scenarios as exemplarily illustrated in FIG. 8C, the users may park the vehicles outside the service area 806, even though heavy penalties may be levied. In some cases, the users may park the vehicles outside the service area 806 due to availability of legal parking spots outside the service area 806. In some scenarios where an overlap of the service areas occurs, and another service area is defined until or closer to a destination of the user, the user of the vehicle parks his/her vehicle within the service area, not essentially, at the edges of the service area and makes a handover and takes a vehicle of another shared vehicle service provider whose service area extends until or closer to a destination of the user. However, using the methods and systems disclosed on the present invention, the user may be able to plan intermodal navigation routes in an efficient manner, reducing their time of travel till their destination. Further, the user may also be able to respond in a more prepared manner to changes in service boundaries.

FIGS. 9A-9C illustrate user interfaces showing impact of the service boundaries on on-street parking predictions, in accordance with an example embodiment. A service area 902 of a shared vehicle service provider is defined as exemplarily illustrated in FIG. 9A. The time-dependent pattern of parking of vehicles along edges of the service area 902 along with the traffic data in and around the service area 902 are also exemplarily illustrated. The mapping platform 106 suggests an extension in the service area 902 by a region 904 as exemplarily illustrated in FIG. 9B. In FIG. 9C, the extended service area 906 shown on the user interface enables the shared vehicle service provider to judge whether the impact of the extension of the service area 902 is positive or negative to the shared vehicle service provider. Positive impacts of extending the service area 902 include drawing more customers to the shared vehicle service provider and providing higher reach to the shared vehicle service provider, decongesting the service area 902 which was previously congested and offering new possibilities to the users to reach some previously unreachable regions. In FIG. 9C, from the traffic data in road links within the extended service area 906, it is evident that the extension has resulted in decongesting the previously congested service area 902. In some example embodiments, using parking predictions provided by the methods and systems disclosed herein may also help the user to better plan their inter-modal navigation routes.

Figure 10A:
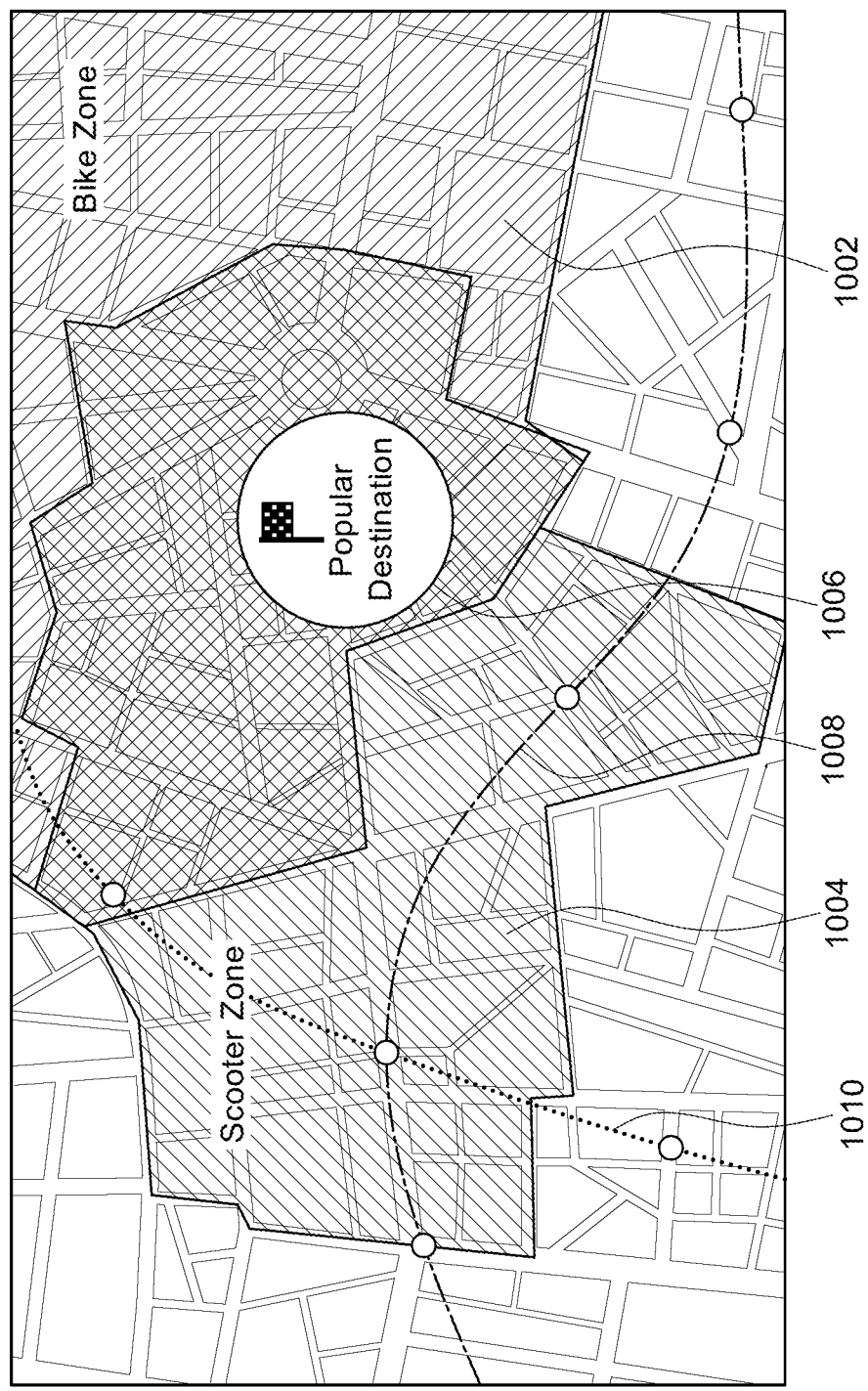
Figure 10B:
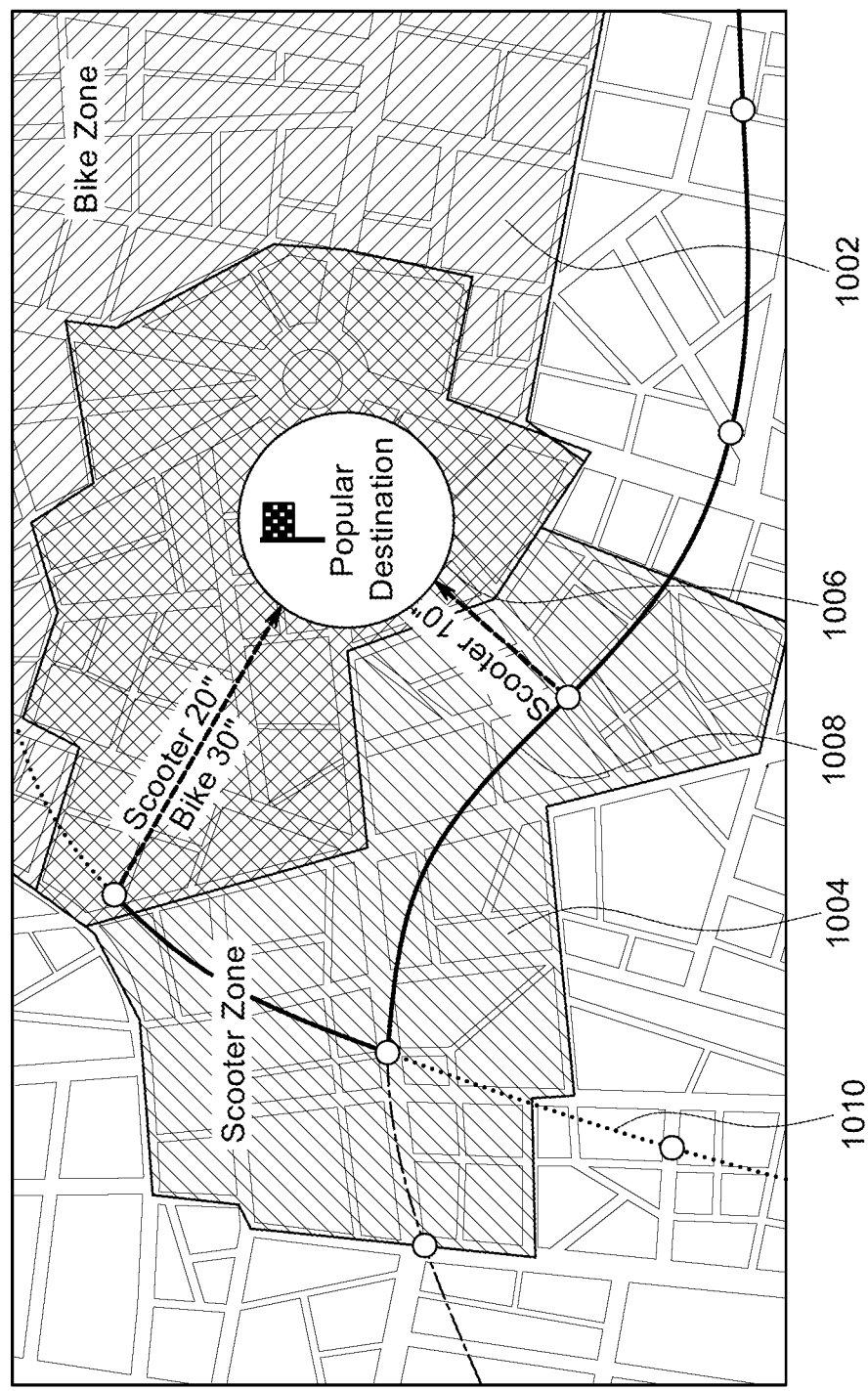
Figure 10C:
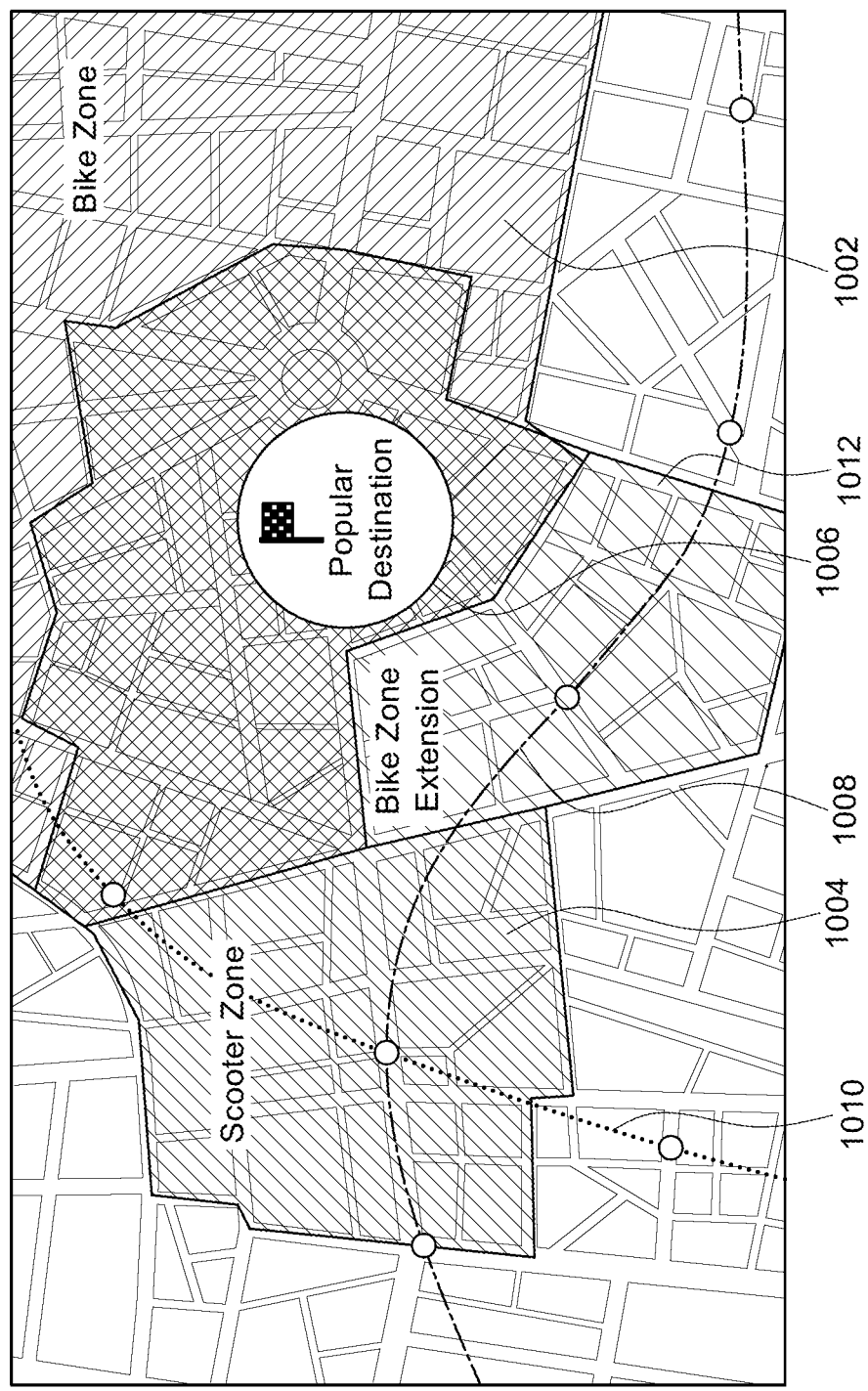
Figure 10D:
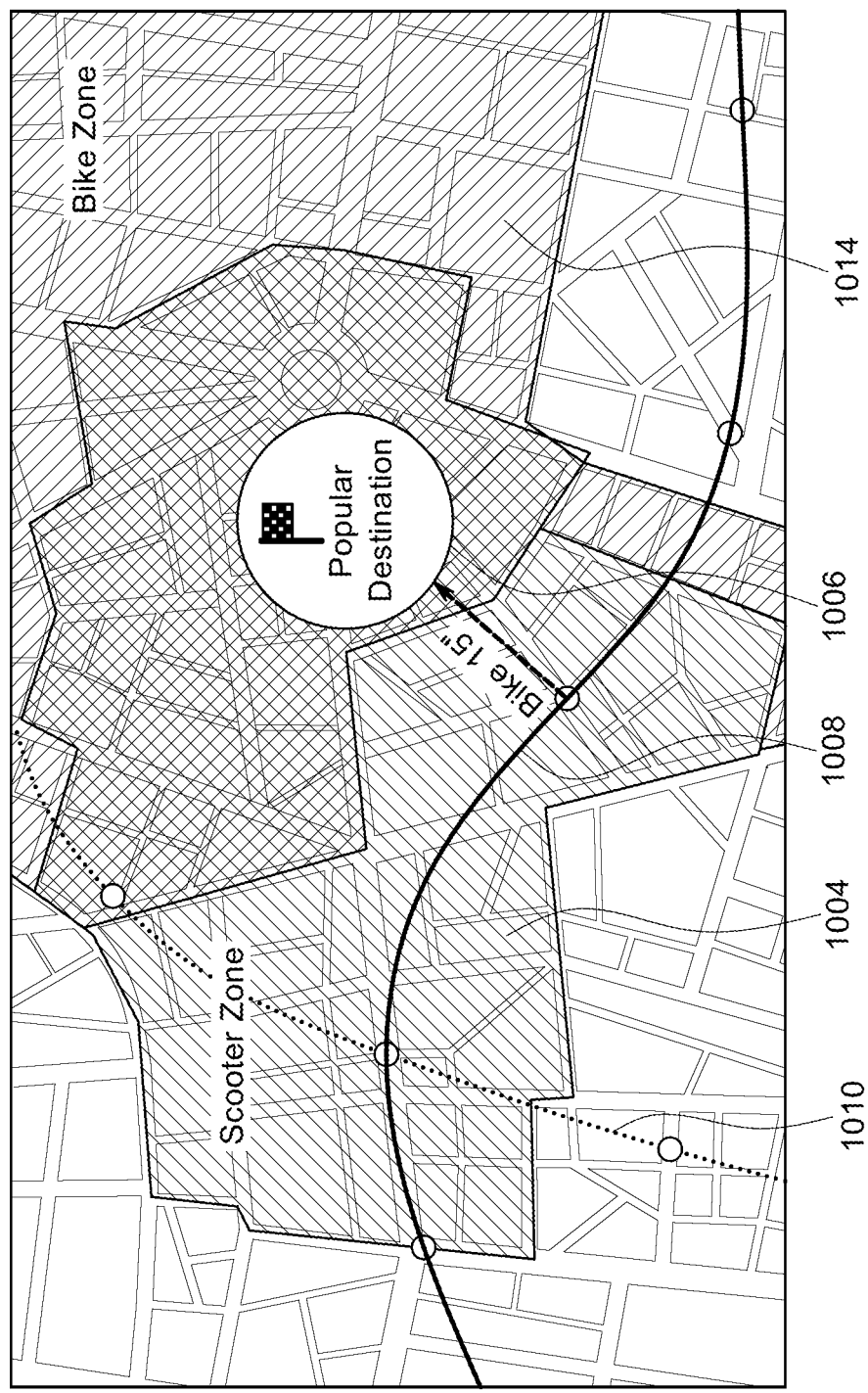

FIGS. 10A-10D illustrate user interfaces showing intermodal connections to a destination enabled by change in service boundaries, in accordance with an example embodiment. As exemplarily illustrated in FIG. 10A, the service areas, 1002 and 1004 of two shared vehicle service providers, a bike sharing service provider and a scooter sharing service provider overlap and a destination 1006 of the user is located in the overlapped region. A public transport network with routes 1008 and 1010 connecting different locations on the road links within the two zones is also illustrated. For example, if a user seeking a vehicle to reach the destination by travelling along the routes 1008 and 1010 as illustrated in FIG. 10B, the user may prefer to use a scooter from a location 10 minutes away from the destination 1006 rather than use a bike to travel 30 minutes to the destination 1006. The service area 1002 of the bike sharing service provider limits the user to seek a bike to the destination 1006 for a shorter distance from a location on route 1008. Also, to use a bike to the destination 1006 for a longer distance, the user has to change to the route 1010 from the route 1008 of the public transport network. FIG. 10C illustrates the suggestion provided by the mapping platform 106 to extend the service area of the bike sharing service provider, that is, the bike zone 1002 to cater to commuters of the route 1008. The extension of the bike zone 1002 enables intermodal connections to the users, making the bike sharing service provider more attractive to the users. The bikes of the bike sharing service provider cater to the commuters of the route 1008 to reach the destination 1006 in a shorter distance as exemplarily illustrated in FIG. 10D.

Thus, the methods and systems disclosed herein may provide better use of intermodal transport and better management of traffic in various road links in different service areas.

FIG. 11 illustrates a user interface showing traffic data in different road links in a service area, in accordance with an example embodiment. As exemplarily illustrated, the traffic data in the road links shown in the user interface is dynamically updated by the mapping platform. The user interface assists the shared vehicle service provider in computing optimal routes to the destination of the user within or outside the service area. Using the traffic data, the mapping platform 106 may recommend the location of the road links with vacant parking spots and when the road links are likely to have vacant parking spots and may suggest parking search routes to navigate to the destination of the user in the current traffic conditions within the service area.

FIG. 12 illustrates a user interface showing traffic data associated with vehicles of one or more shared vehicle service providers in a service area, in accordance with an example embodiment. As exemplarily illustrated, extension of a service area by a shared vehicle service provider has an impact on the traffic patterns within or outside the extended service area. The traffic patterns in the service area at real-time are rendered on the user interface of the user equipment along with navigation directions to a destination of a user as exemplarily illustrated.

FIG. 13 illustrates a user interface showing notifications generated for assisting in parking of a vehicle, in accordance with an example embodiment. The notifications include parking restrictions, a parking availability index, parking estimation times in available parking spots, and real-time parking spot recommendations, and parking options in the available parking spots. The parking restrictions may road link based attributes indicating presence and type of allowed on-street parking per side of the road link in the service area. The parking availability index includes a road link level index showing the likelihood of finding a parking spot in the service area. The parking estimation times indicate in minutes the time taken for a user of the vehicle to find a parking spots. The parking options may include paid, free, or lower-priced parking options may be based on charges per hour of on-street parking.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A system for providing on-street per link parking predictions, comprising:
    at least one non-transitory memory configured to store computer program code instructions; and
    at least one processor configured to execute the computer program code instructions to:
    receive service boundary geometry data for a service boundary from one or more shared vehicle service providers, the one or more shared vehicle service providers providing one or more vehicles operated by a user;
    provide on-street per link parking predictions, based on the received service boundary geometry data; and
    render a representation of the on-street per link parking predictions on a user interface of a user device,
    wherein the user interface enables one or more user interactions with the representation.

2. The system of claim 1, wherein the processor is further configured to:
    receive a modification for the service boundary geometry data for the one or more shared vehicle service providers via the user interface of the user device;
    update the on-street parking predictions based on the modified service boundary geometry data; and
    update the representation of the on-street parking predictions on the user interface of the user device, based on the updated on-street parking predictions.

3. The system of claim 1, wherein the service boundary geometry data is associated with a determined time-dependent parking pattern adjacent to the service boundary.

4. The system of claim 3, wherein the processor is further configured to update on-street per link parking predictions based on time of day.

5. The system of claim 3, wherein the processor is further configured to determine the time-dependent parking pattern based on at least one load balancing model of the vehicles of the one or more shared vehicle service providers.

6. The system of claim 3, wherein the processor is further configured to:
    obtain parking impact data based on the time-dependent parking pattern; and
    render a recommendation, on the user interface, for updating the service boundary geometry data of the one or more shared vehicle service providers, based on the parking impact data.

7. The system of claim 6, wherein the parking impact data comprises one or more of a time of day, number of the vehicles within a service boundary, pollution causing events within the service boundary, occurrence of fairs within the service boundary, and traffic data within the service boundary.

8. The system of claim 6, wherein the parking impact data is further based on an availability of alternate modes of transport within a service boundary.

9. The system of claim 1, wherein the processor is configured to generate the on-street parking predictions by training a candidate machine learning model using one or more of historical sensor data from a plurality of vehicles of the one or more shared vehicle service providers, real-time sensor data from the plurality of vehicles of the one or more shared vehicle service providers, parking spot availability data, destination information of a user of a vehicle, and navigation routes within a service area.

10. The system of claim 1, wherein the processor is further configured to notify via the user device about at least one of changes in service boundaries, an availability of parking spots in road links within the service boundaries, parking estimation times in available parking spots in the road links, and parking options in the available parking spots in the road links.

11. A method for providing on-street per link parking predictions, comprising:
    receiving, by a processor, service boundary geometry data for a service boundary from one or more shared vehicle service providers, the one or more shared vehicle service providers providing one or more vehicles operated by a user;
    providing on-street per link parking predictions, based on the received service boundary geometry data; and
    rendering, by the processor, a representation of the on-street per link parking predictions on a user interface of a user device,
    wherein the user interface enables one or more user interactions with the representation.

12. The method of claim 11, further comprising:
    receiving a modification for the service boundary geometry data for the one or more shared vehicle service providers via the user interface of the user device;
    updating the on-street parking predictions based on the modified service boundary geometry data; and
    updating the representation of the on-street parking predictions on the user interface of the user device, based on the updated on-street parking predictions.

13. The method of claim 11, wherein the service boundary geometry data is associated with a determined time-dependent parking pattern adjacent to the service boundary.

14. The method of claim 13, further comprising updating the on-street per link parking predictions based on time of day.

15. The method of claim 13, wherein the time-dependent parking pattern is determined based on at least one load balancing model of the vehicles of the one or more shared vehicle service providers.

16. The method of claim 13, further comprising:
    obtaining parking impact data based on the time-dependent parking pattern; and
    rendering a recommendation, on the user interface, for updating the service boundary geometry data of the one or more shared vehicle service providers based on the parking impact data.

17. The method of claim 16, wherein the parking impact data is based on an availability of alternate modes of transport within a service boundary.

18. The method of claim 11, wherein generating the on-street parking predictions comprises training a candidate machine learning model using one or more of historical sensor data from a plurality of vehicles of the one or more shared vehicle service providers, real-time sensor data from the plurality of vehicles of the one or more shared vehicle service providers, parking spot availability data, destination information of a user of a vehicle, and navigation routes within a service area.

19. The method of claim 11, further comprising notifying via the user device about at least one of changes in service boundaries, availability of parking spots in road links within the service boundaries, parking estimation times in available parking spots in the road links, and parking options in the available parking spots in the road links.

20. A computer program product comprising at least one non-transitory computer-readable storage medium having stored thereon computer-executable program code instructions which when executed by a computer, cause the computer to carry out operations for providing on-street per link parking predictions, the operations comprising:

receiving service boundary geometry data from one or more shared vehicle service providers, the one or more shared vehicle service providers providing one or more vehicles operated by a user;

providing the on-street per link parking predictions, based on the received service boundary geometry data; and rendering a representation of the on-street per link parking predictions on a user interface of a user device, wherein the user interface enables one or more user interactions with the representation.

21. The computer program product of claim 20, wherein the operations further comprise:

receiving a modification for the service boundary geometry data for the one or more shared vehicle service providers via the user interface of the user device;

updating the on-street parking predictions based on the modified service boundary geometry data; and updating the representation of the on-street parking predictions on the use interface of the user device, based on the updated on-street parking predictions.

* * * * *